United States Patent [19]

Sasaki et al.

[11] Patent Number: 5,237,470
[45] Date of Patent: Aug. 17, 1993

[54] MAGNETIC TAPE CASSETTE LOADING/UNLOADING APPARATUS WHICH SELECTIVELY LOADS DIFFERENT SIZE CASSETTES

[75] Inventors: Kenji Sasaki; Hitoshi Minabe, both of Neyagawa; Tetsurou Tanaka, Hirakata; Keiji Sakamoto, Katano; Yoshiyuki Shimizu, Osaka, all of Japan

[73] Assignee: Matsushita Electric Industrial Co., Ltd., Osaka, Japan

[21] Appl. No.: 841,216

[22] Filed: Feb. 27, 1992

Related U.S. Application Data

[63] Continuation of Ser. No. 433,016, Nov. 7, 1989, abandoned.

[30] Foreign Application Priority Data

| Nov. 14, 1988 | [JP] | Japan | 63-287013 |
| Dec. 26, 1988 | [JP] | Japan | 63-328264 |
| Feb. 21, 1989 | [JP] | Japan | 1-040856 |
| Mar. 23, 1989 | [JP] | Japan | 1-070826 |
| Apr. 11, 1989 | [JP] | Japan | 1-091329 |

[51] Int. Cl.⁵ .................. G11B 5/008; G11B 15/60
[52] U.S. Cl. .................................... 360/94; 360/96.5
[58] Field of Search .............. 360/85, 94, 95, 96.5, 360/96.6

[56] References Cited

U.S. PATENT DOCUMENTS

| 4,012,790 | 3/1977 | Lemelson | 360/94 |
| 4,479,618 | 10/1984 | Okada et al. | 360/94 |
| 4,536,810 | 8/1985 | Umeda | 360/94 |
| 4,622,605 | 11/1986 | Tsuruoka et al. | 360/94 |
| 4,782,407 | 11/1988 | Hwang | 360/85 |
| 4,844,377 | 7/1989 | Shiomi et al. | 360/60 |
| 4,866,550 | 9/1989 | Ohashi et al. | 360/94 |
| 4,903,149 | 2/1990 | Hasegawa et al. | 360/94 |
| 4,964,001 | 10/1990 | Hirayama et al. | 360/94 |
| 4,972,278 | 11/1990 | Hara et al. | 360/94 |
| 4,991,043 | 2/1991 | Harumatsu et al. | 360/94 |
| 5,012,364 | 4/1991 | Hirayama et al. | 360/94 |
| 5,018,030 | 5/1991 | Ohashi | 360/94 |

FOREIGN PATENT DOCUMENTS

| 0234660 | 9/1987 | European Pat. Off. . | |
| 0293202 | 11/1988 | European Pat. Off. | 360/96.5 |
| 0342619 | 11/1989 | European Pat. Off. . | |
| 0384664 | 8/1990 | European Pat. Off. . | |
| 2015021 | 4/1970 | France . | |
| 2025675 | 9/1970 | France . | |
| 56-140547 | 11/1981 | Japan | 360/96.5 |
| 2091687 | 8/1982 | United Kingdom . | |

*Primary Examiner*—Stuart S. Levy
*Assistant Examiner*—Jefferson Evans
*Attorney, Agent, or Firm*—Stevens, Davis, Miller & Mosher

[57] ABSTRACT

A cassette loading/unloading apparatus enables a magnetic recording and reproducing device to be used with both a standard-type tape cassette and a miniature tape cassette without a cassette adapter. When the miniature tape cassette is used, a holding mechanism for the standard-type tape cassette is located at a position where it does not hinder the loading of the miniature tape cassette. When the standard-type tape cassette is used, a holding mechanism for holding the miniature tape cassette is located at a position where it does not hinder the loading of the standard-type tape cassette. Further, only one tape extraction mechanism and only one detection unit for detecting an anti-erasure claw are provided for extracting a magnetic tape from either of the standard type tape cassette and the miniature-tape cassette and for detecting the presence of the anti-erasure claw of either of the two types of tape cassettes.

6 Claims, 29 Drawing Sheets

MAGNETIC TAPE CASSETTE LOADING/UNLOADING APPARATUS WHICH SELECTIVELY LOADS DIFFERENT SIZE CASSETTES

This application is a continuation of application Ser. No. 07/433,016, filed Nov. 7, 1989 (abandoned).

SUMMARY OF THE INVENTION

1. Field of the Invention

The present invention relates to a magnetic tape cassette loading/unloading apparatus for a magnetic recording and/or reproducing apparatus which is capable of performing signal recording and/or reproduction with two types of magnetic tape cassettes of different sizes.

2. Description of the Prior Art

A magnetic recording and/or reproducing apparatus (sometimes referred to as "recording/reproducing apparatus" hereinafter) has been known which is capable of conducting recording/reproduction with two types of magnetic tape cassettes: namely, a first-type tape cassette and a second-type tape cassette which contains a magnetic tape of a length smaller than that of the magnetic tape contained in the first cassette and which has a size smaller than that of the first tape cassette. In general, this type of magnetic recording/reproducing apparatus has a tape insertion opening provided in the front side thereof and capable of receiving a first tape cassette An example of this kind of apparatus is disclosed in the specification of U.S. Pat. No. 4,479,618. In this apparatus, when a tape cassette of the second type is used, the second-type tape cassette is set in a cassette adapter. The cassette adapter has tape extraction means which can extract the magnetic tape from this cassette so as to form a tape running path substantially the same as that formed by the tape in the first-type tape cassette. Then, the tape cassette adapter together with the second-type tape cassette is inserted into the tape insertion opening formed in the front side of the apparatus so that the apparatus can record and/or reproduce signals in the same manner as the operation with the first-type tape cassette In this known magnetic recording/reproducing apparatus, the tape cassette adapter is usually stored outside the recording/reproducing apparatus. Therefore, the user who wishes to use the second-type tape cassette has to find the tape cassette adapter and set the second-type tape cassette on the tape cassette adapter. Then, the user has to wait until the magnetic tape in the first type tape cassette is extracted to form a tape running path which is substantially the same as that formed by the tape of the first-type tape cassette, before the magnetic tape becomes ready to use. In addition, the user is obliged to exert a laborious effort when the tape cassette of the second type now being used is to be changed to another tape cassette of the second time. Namely, the user has to take the tape cassette adapter out of the apparatus, demount the tape cassette from the tape cassette adapter, mount the new tape cassette of the second type on the tape cassette adapter, and, after the magnetic tape is extracted as described above, insert the tape cassette adapter into the tape cassette insertion opening.

Thus, the known apparatus of the kind described is difficult and troublesome to use particularly when the tape cassette of the second type is used.

In order to overcome the above-described problems of the prior art, the specification of U.S. Pat. No. 4,622,605 discloses an apparatus in which a tape cassette adapter remains in the apparatus and in which exchange of the tape cassette of the second type is conducted through a second tape cassette insertion opening formed in the upper side of the apparatus. This apparatus, however, also suffers from a problem in that the tape cassette adapter has to be demounted from the apparatus and stored elsewhere when the apparatus is used with a tape cassette of the second type. Thus, troublesome steps are necessary when a tape cassette of the second type is to be used again, i.e., such steps include getting the tape cassette adapter, mounting the tape cassette of the second type therein, and, after extraction of the magnetic tape, inserting the tape cassette adapter into the apparatus. This apparatus, therefore, still encounters with a problem in regard to alternating use of the tape cassettes of the first and second types.

SUMMARY OF THE INVENTION

Accordingly, an object of the present invention is to provide a magnetic tape cassette loading/unloading apparatus for a magnetic recording/reproducing apparatus which can operate not only a standard-type tape cassette but also a miniature tape cassette without aid of any tape cassette adapter.

Another object of the present invention is to provide a magnetic tape cassette loading/unloading apparatus for a magnetic recording/reproducing apparatus in which a tape cassette of standard type and a miniature tape cassette can be mounted through a common cassette insertion opening.

Still another object of the present invention is to provide a magnetic tape cassette loading/unloading apparatus for a magnetic recording/reproducing apparatus in which a common tape extraction mechanism is provided both for a miniature tape cassette.

A further object of the present invention is to provide a magnetic tape cassette loading/unloading apparatus for a magnetic recording/reproducing apparatus in which a common detection means is used for detecting anti-erasure claws on both a miniature tape cassette and a standard-type tape cassette.

These objects of the present invention are achieved by a magnetic tape cassette loading/unloading apparatus for a magnetic recording/reproduction apparatus of the invention set forth in the attached claims.

These and other objects and advantages of the invention will become clear from the following description of the preferred embodiments when the same is read in conjunction with the accompanying drawings.

BRIEF DESCRIPTION OF THE DRAWINGS

The attached drawing FIGS. 1 to 36 illustrate preferred embodiments of a magnetic tape cassette loading/unloading apparatus for reproducing apparatus of the present invention in which:

FIG. 1 is a perspective view of an embodiment of the magnetic recording and/or reproducing apparatus of the present invention in a stand-by condition;

FIG. 2 is a side elevational view of a critical portion of the apparatus in a standard-type tape cassette stand-by condition;

FIG. 3 is a front elevational view of a critical portion of the apparatus in the standard-type tape cassette stand-by condition;

FIG. 4 is a front sectional side view of a critical portion of the apparatus in the standard-type tape cassette stand-by condition;

FIG. 5 is a sectional side elevational view of a critical portion of apparatus in which the standard-type tape cassette is inserted;

FIG. 6 is a side elevational view of a critical portion of the apparatus in a state mounting the standard-type cassette;

FIG. 7 is a perspective view of the apparatus in which a miniature tape cassette is mounted in a stand-by state;

FIG. 8 is a side elevational view of the apparatus showing the critical portion in a transient state from the standard-type cassette stand-by condition to the miniature tape-cassette stand-by condition;

FIG. 9 is a side elevational view of the critical portion of the apparatus in a miniature tape cassette stand-by state;

FIG. 10 is a front view of the critical portion of the apparatus in a miniature tape cassette stand-by state;

FIG. 11 is a plan view of the critical portion of the apparatus in a miniature tape cassette stand-by condition;

FIG. 12 is a side elevational view of the critical portion of the apparatus with the miniature tape cassette inserted therein;

FIG. 13 is a plan view of the critical portion of the apparatus with the miniature tape cassette inserted therein;

FIG. 14 is a side elevational view of the critical portion of the apparatus with the miniature tape cassette inserted therein;

FIG. 15 is a plan view of the critical portion of the apparatus with the miniature tape cassette inserted therein;

FIG. 16 is a front elevational view of the critical portion of the apparatus with the miniature tape cassette inserted therein;

FIG. 17 is a perspective view of a mechanism for opening the front lid of the miniature tape cassette;

FIG. 18 is a cam diagram showing the features of a first cam groove and a second cam groove formed in a cam gear 30;

FIG. 19 is a plan view of the apparatus with the standard-type tape cassette inserted therein;

FIG. 20 is a plan view of the apparatus in a state in which the standard-type cassette is set for recording or reproduction;

FIG. 21 is a plan view of the apparatus with the miniature tape cassette inserted therein;

FIG. 22 is a plan view of the apparatus in which the miniature tape cassette is set for recording or reproduction;

FIG. 23 is a sectional view of the apparatus showing a tape-extracting portion thereof;

FIGS. 24, 25 and 26 are sectional views of a second locating means and a shifting means;

FIGS. 27 and 28 are sectional views of a connecting means and an urging means;

FIG. 29 is a plan view of an anti-erasure claw detecting device in a state detecting absence of an anti-erasure claw in a miniature tape cassette;

FIG. 30 is a plan view of an anti-erasure claw detecting device in a state detecting presence of an anti-erasure claw in a miniature tape cassette;

FIGS. 31 and 32 are sectional views of critical portions of the arrangements shown in FIGS. 29 and 30;

FIG. 33 is a sectional view of a critical portion of the apparatus illustrative of an operation for loading a miniature tape cassette on a tape driving means;

FIG. 34 is a plan view of the apparatus illustrative of the state for detecting presence or absence of an anti-erasure claw in the standard-type tape cassette;

FIG. 35 is a sectional view of a critical portion of the apparatus showing in a state immediately before the loading on a tape driving means; and FIG. 36 is a sectional view of a critical portion of the apparatus in a state in which the standard-type tape cassette has been loaded on the tape driving means.

DESCRIPTION OF THE PREFERRED EMBODIMENTS

Preferred embodiments of the invention will be described with reference to the accompanying drawings.

Figure 1:
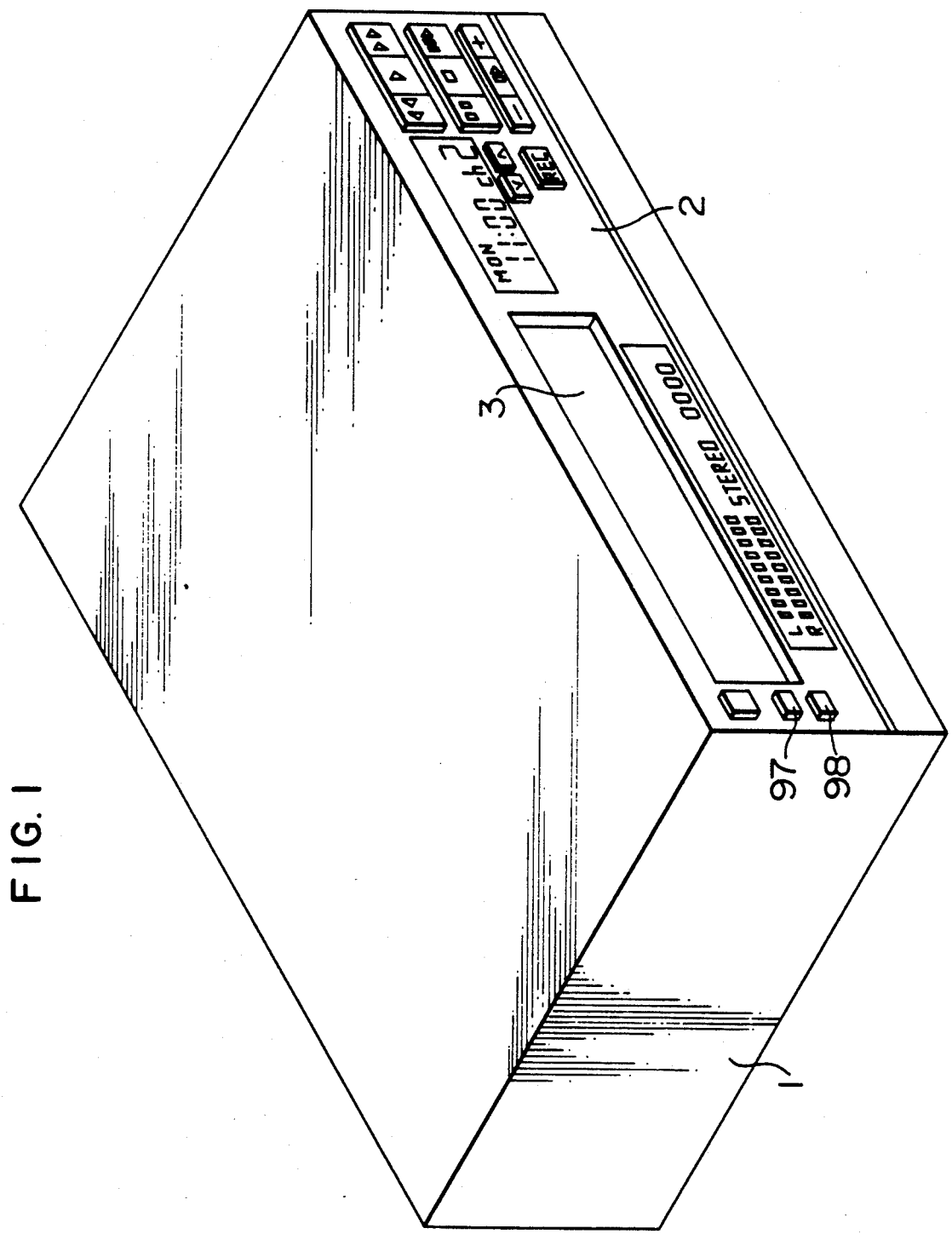
Figure 2:
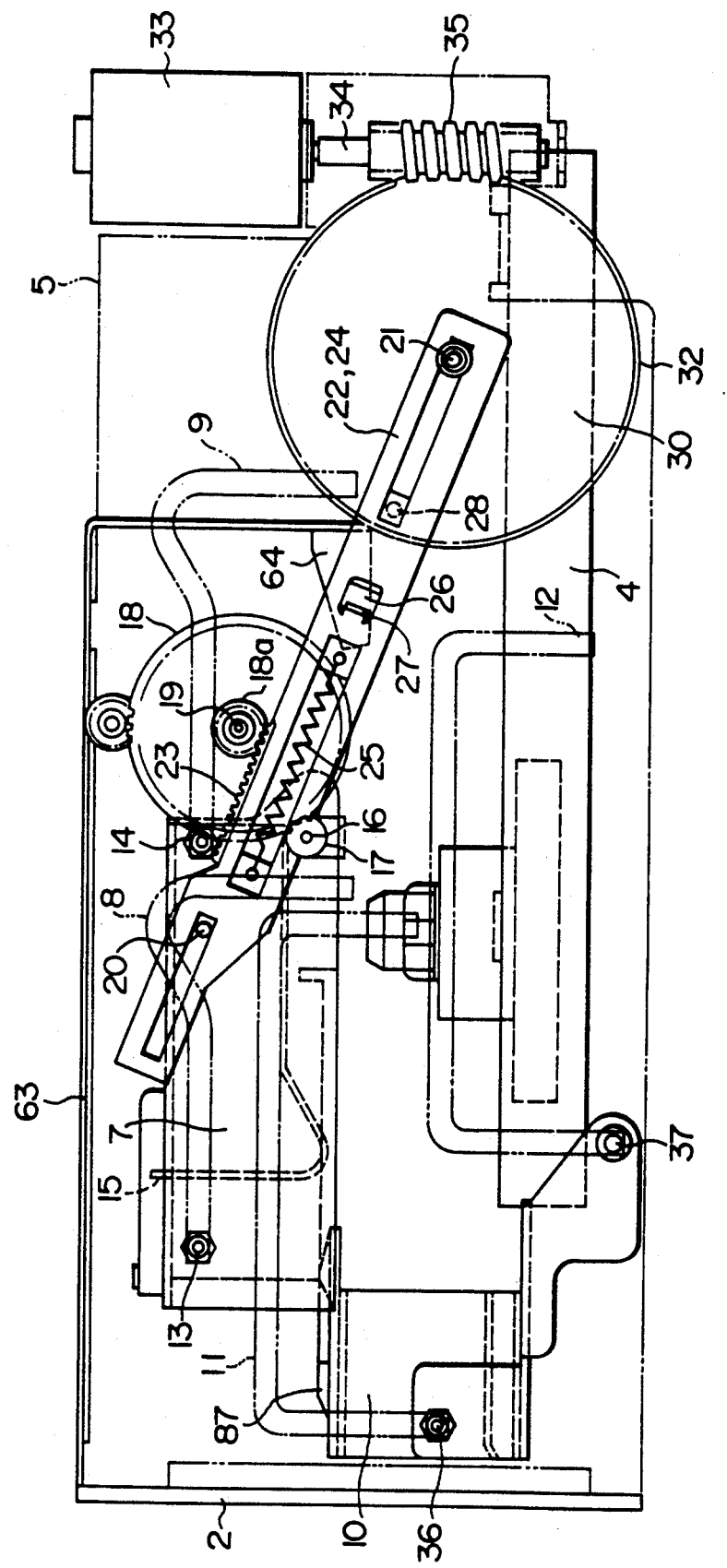
Figure 18:
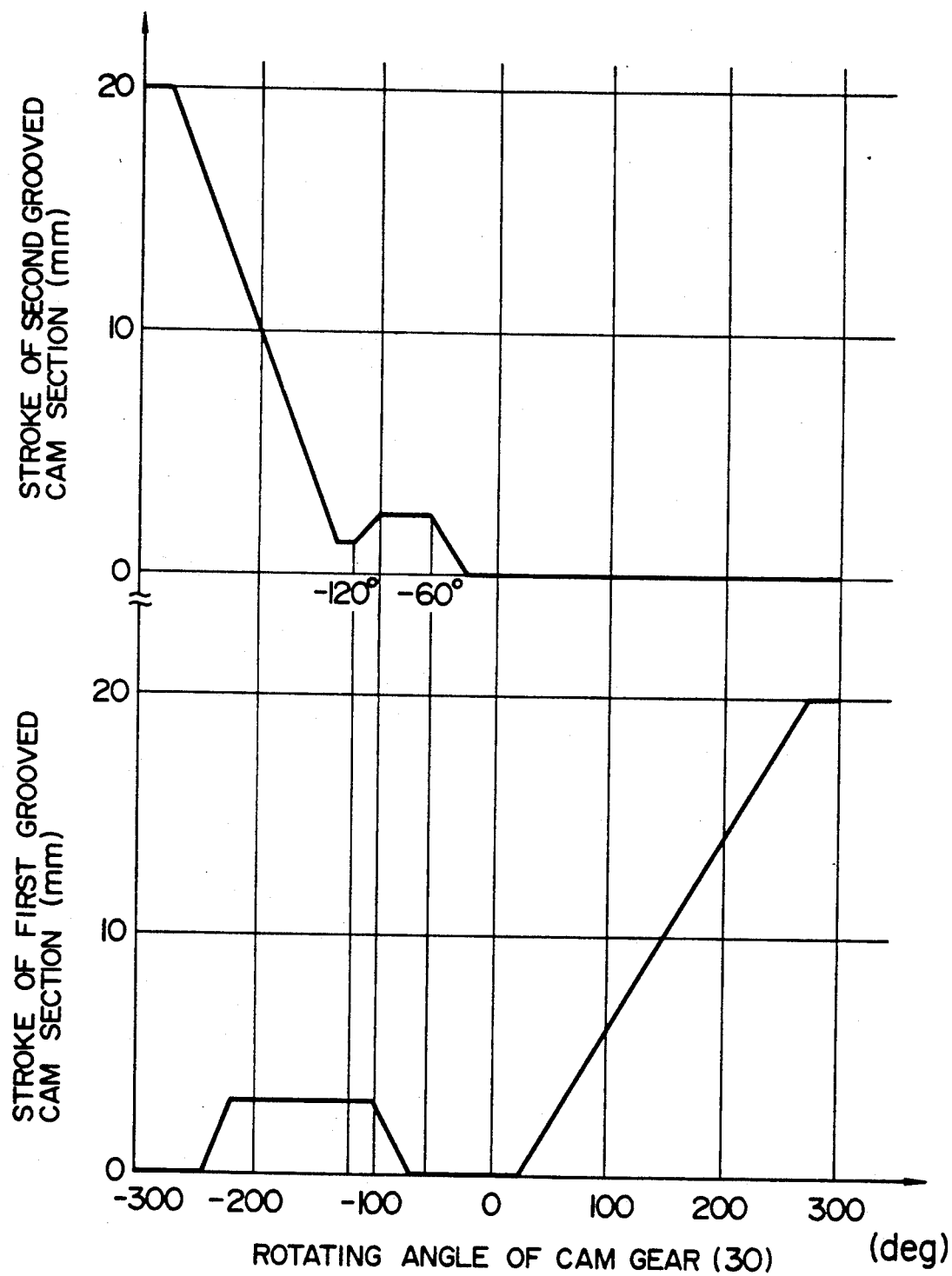

FIG. 1 is a perspective view of an embodiment of the magnetic recording and/or reproducing apparatus. The apparatus 1 has a tape cassette insertion opening 3 formed in a front panel 2 thereof FIG. 2 is a side elevational view of a critical portion of the apparatus in a state ready for inserting a standard-type tape cassette. The construction of a mechanism for loading the standard-type tape cassette will be described with reference to FIG. 2. Vertical supporting plates 5 and 6, which are disposed substantially vertically on left and right sides of a chassis 4 of the apparatus, are provided with guide grooves 8 and 9 for guiding a standard-type tape cassette holder 7 and guide grooves 11 and 12 for guiding a miniature tape cassette holder 10. The standard-type tape cassette holder 7 has projections 13 and 14 which slidingly engage with the guide grooves 8 and 9. The standard-type tape cassette holder 7 has a rack 15 which meshes with a pinion gear 17 rotatably supported on a shaft 16 held by the vertical supporting plates 5 and 6. The pinion gear 17 meshes with a gear 18 rotatably carried by a shaft 19 provided on the vertical supporting plate 5. The gear 18 has a pinion gear 18a integral therewith and meshing with a rack 23 on a slide lever 22 which is slidably supported by shafts 20 and 21 provided on the vertical supporting plate 5. The slide lever 22 is operatively connected through a tension spring 25 to a slider lever 24 which is slidably supported by shafts 20 and 21. In the state shown in FIG. 2, a projection 27 on the slide lever 24 is received in a hole 26 formed in the slide lever 22 so that the tension spring 25 does not produce any urging force. A cam follower 28 provided on the slide lever 24 engages with a first cam groove (not shown) formed in one side of a cam gear 30 which is rotatably carried by the shaft 21 on the vertical supporting plate 5. The cam gear 30 has a spur gear portion 32 which meshes with a worm 35 fixed to a rotary shaft 34 of a driving motor 33, so that the cam gear 30 rotates as the driving motor 33 operates. FIG. 18 is a cam diagram showing the features of the first and second cam grooves formed in the cam gear 30. In the state shown in FIG. 2, the cam gear 30 is in a position corresponding to 0° in terms of the rotation angle shown in FIG. 18. The plus (+) and minus (−) signs of the cam diagram shown in FIG. 18 correspond to clockwise and counterclockwise rotation of the cam gear 30 from the position shown in FIG. 2. Therefore, the standard-type tape cassette holder 7 reciprocating moves between the position shown in FIG. 2 and the position shown in FIG. 6, when the cam gear 30 rotates within a range between 0 and +300° as a result of operation of the driving motor 33.

Figure 8:
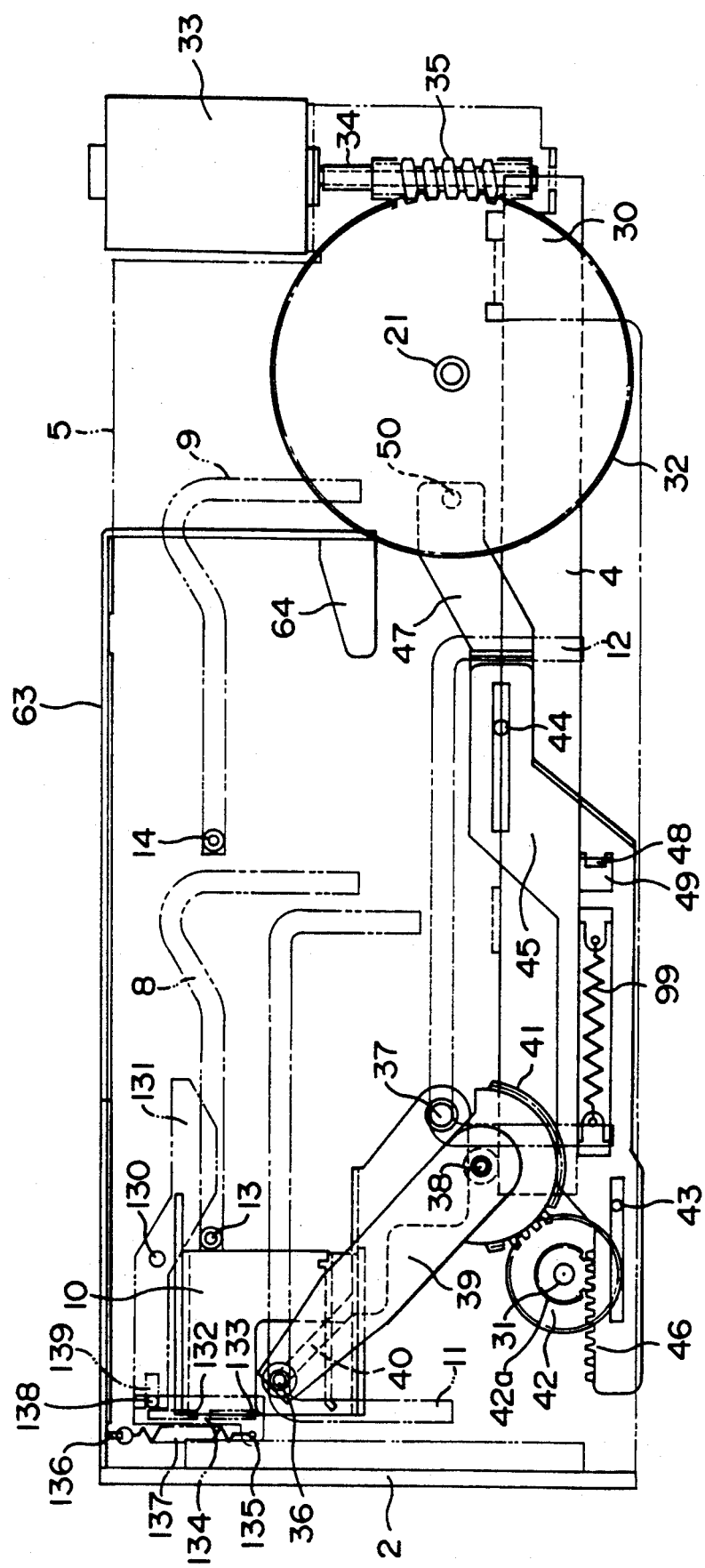
Figure 9:
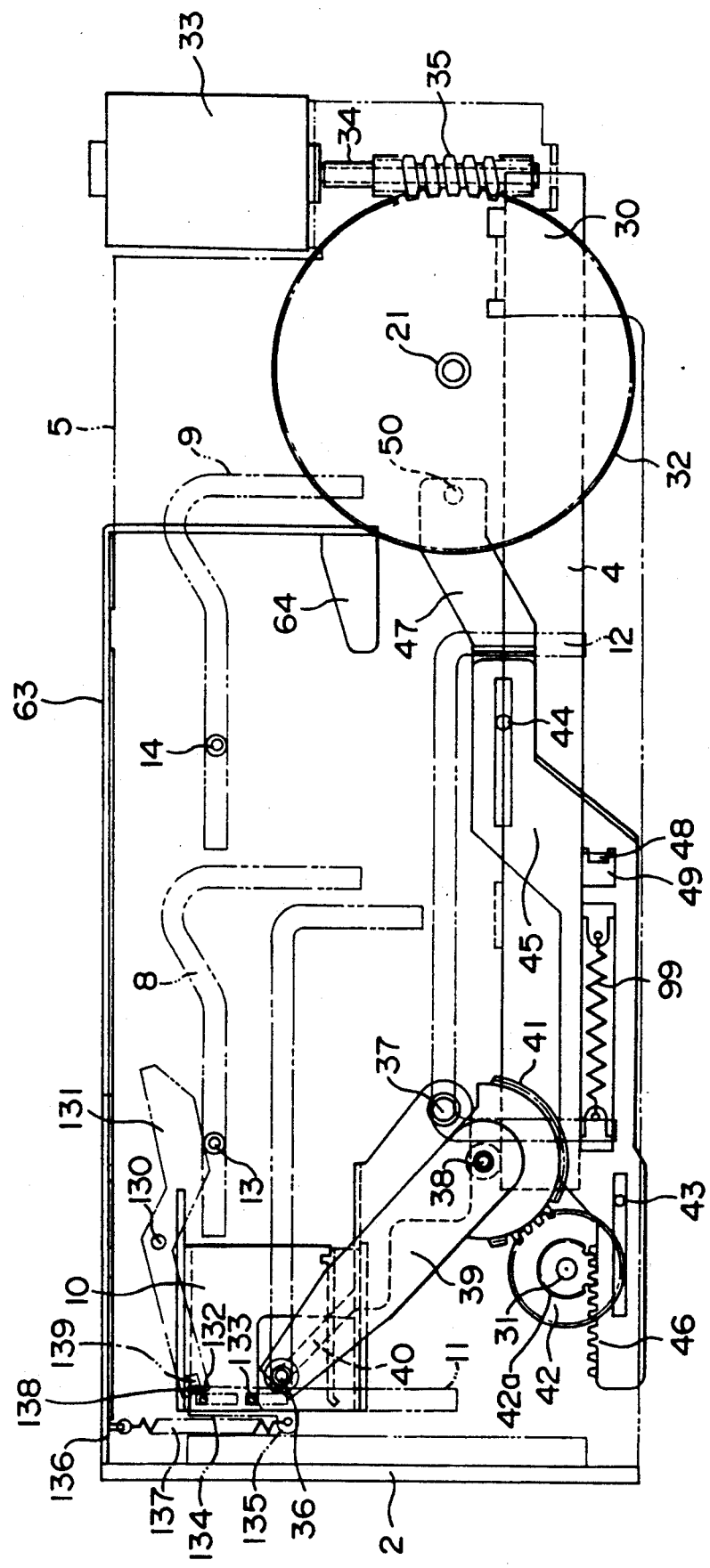
Figure 17:
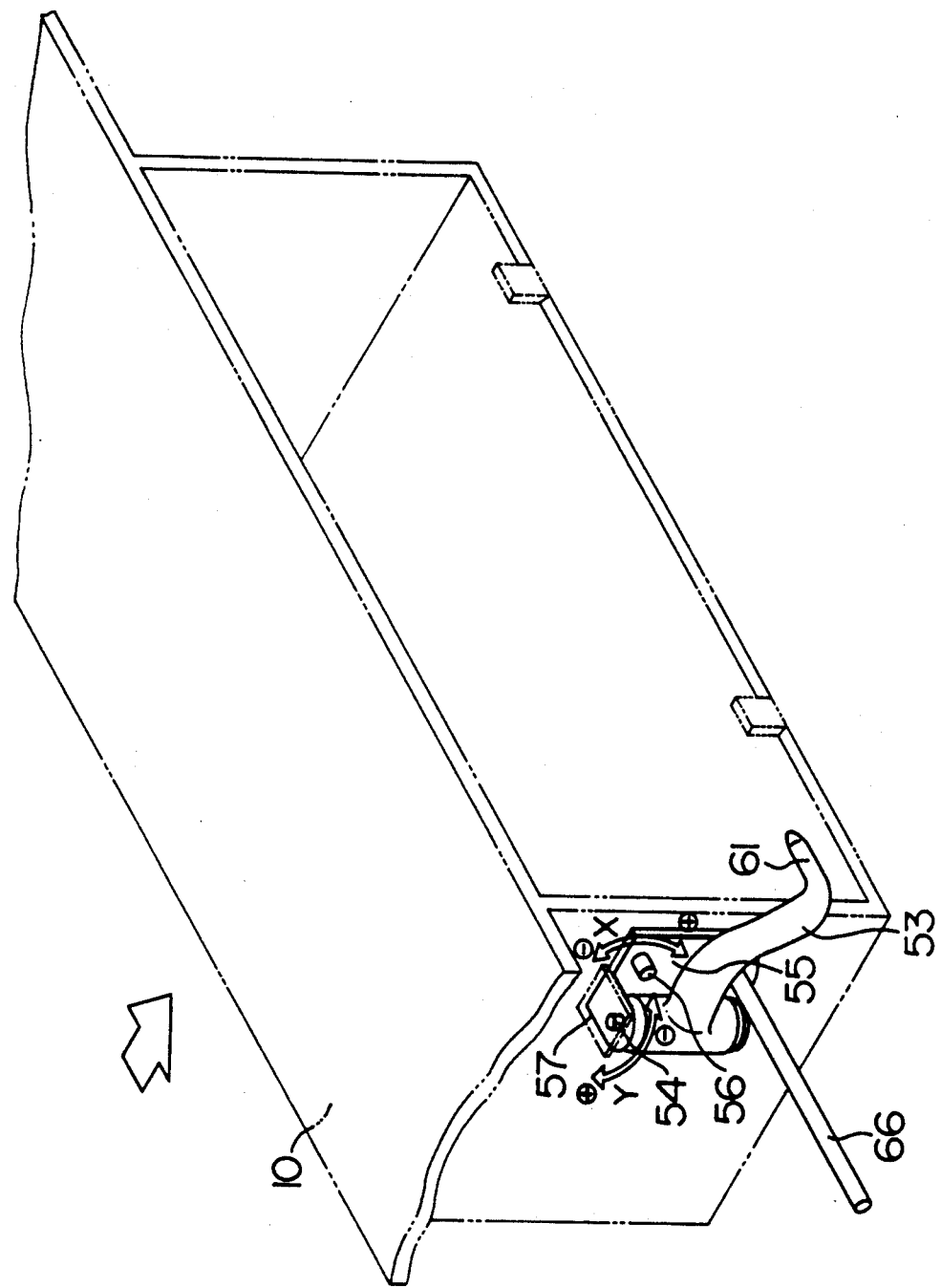

A description will be given of a mechanism for mounting the miniature tape cassette, with specific reference to FIG. 9. Vertical supporting plates 5 and 6 provided on the left and right sides of the chassis 4 of the apparatus are provided with the guide grooves 15 and 16 for guiding the miniature tape cassette holder 10. More specifically, the miniature tape cassette holder 10 has projections 36 and 37 which slidably engage with the guide grooves 11 and 12. The projection 36 also slidably engages with a groove 40 in a driving arm 39 which is rotatably carried by a shaft 38 provided on the vertical supporting plates 5 and 6. The driving arm 39 is provided with a gear portion 41 which meshes with a gear 42 rotatably supported by a shaft 31 provided on the vertical supporting plate 5. The gear 42 has a pinion gear 42a integral therewith and meshing with a rack 46 on a slide lever 45 slidably supported by shafts 43 and 44 on the vertical supporting plate 5. The slide lever 45 is operatively connected through a tension spring 99 to a slide lever 47 which is slidably carried by shafts 43 and 44 on the vertical supporting plate 5. In the state shown in FIG. 8, a projection 48 of the slide lever 45 contacts with a hole 49 in the slide lever 47 so that the urging force of the tension spring 99 is not utilized in this state. A cam follower 50 provided on the slide lever 47 slidably engages with a second cam groove (not shown) which is provided in the side of the cam groove 30 opposite to the first cam groove (not shown). As stated before, the cam gear 30 is rotatingly driven by the driving motor 33. Since the second cam groove (not shown) has a stroke as shown in FIG. 17, a reciprocatory motion of the apparatus is caused between the state of FIG. 2 and the state of FIG. 14 past the state of FIG. 8 as a result of rotation of the cam gear 30 in the region between −300° and 0°.

A description will be given of a retaining means for locating and retaining the miniature cassette holder 10 at a miniature tape cassette stand-by state shown in FIG. 9, as well as driving means for driving the retaining means. Referring to FIGS. 8 and 9, the driving arm 131 is rotatably carried by a shaft 130 provided on the vertical supporting plate 5. The driving arm 131 has a groove 139 which slidably engages with a projection 138 on a retaining lever 134 slidably supported by the shafts 132 and 133 on the vertical supporting plate 5. A tension spring 137 is stretched between a spring retaining portion 135 of the retaining lever 134 and a spring retaining portion 136 of the vertical supporting plate 5, so as to urge the retainer lever 134 upward as viewed in FIG. 8. In consequence, clockwise urging force is applied to the driving arm 131 as viewed in FIG. 8. When the standardtype tape cassette holder 7 is moved to the position shown in FIG. 9, the projection 13 of the standard-type tape cassette holder 7 drives the driving arm 131 counter-clockwise as viewed in FIG. 9, so that the retaining lever 134, the projection 132 of which is held in engagement with the groove 139 of the driving arm 131, is made to slide downward as viewed in FIG. 9 so as to close the guide groove 11 for the miniature tape cassette holder 10.

A description will be given of a mechanism for opening the front lid of the miniature tape cassette Referring to FIG. 13, a conversion lever 51 is rotatably supported by a shaft 52 which is provided on the miniature tape cassette holder 10. Referring to FIG. 17, the lid-opening lever 53 is rotatably carried by a shaft 54 provided on an auxiliary lever 55 which in turn is rotatably supported by a shaft 56 provided on the miniature tape cassette holder 10. A lid opening lever 53 is urged by a torsion spring (not shown) in a direction Y+. On the other hand, the auxiliary lever 55 is rotationally urged in the X+direction by another torsion spring (not shown). The shaft 54 abuts against a projection 57 of the miniature tape cassette holder 10 so that the shaft 54 is retained at the position shown in FIG. 17. Therefore, when the miniature tape cassette 58 is inserted into the miniature tape cassette holder 10, a projection 61 of the lid-opening lever 53 is moved into the space between the front lid 59 of the miniature tape cassette 58 and the main part 60 of the same. When the miniature tape cassette holder has been advanced to a position shown in FIG. 15, a projection 62 formed on the conversion lever 51 engages with a lid-opening portion 64 for opening the front lid 100 of the standard- o type tape cassette 89, the lid-opening portion 64 being formed on an upper plate 63. In consequence, the miniature tape cassette holder 10 is moved to a position shown in FIG. 14. This causes the conversion lever 51 to rotate counter-clockwise, so that the auxiliary lever 55 also rotates counterclockwise as its shaft 66 is pressed by a projection of the conversion lever 51. The rotation of the auxiliary lever 55 in turn causes the lid-opening lever 53 to rotate integrally therewith in the counter-clockwise direction as viewed in FIG. 14, whereby the front lid 59 of the miniature tape cassette 58 is opened as shown in FIG. 14.

Figure 3:
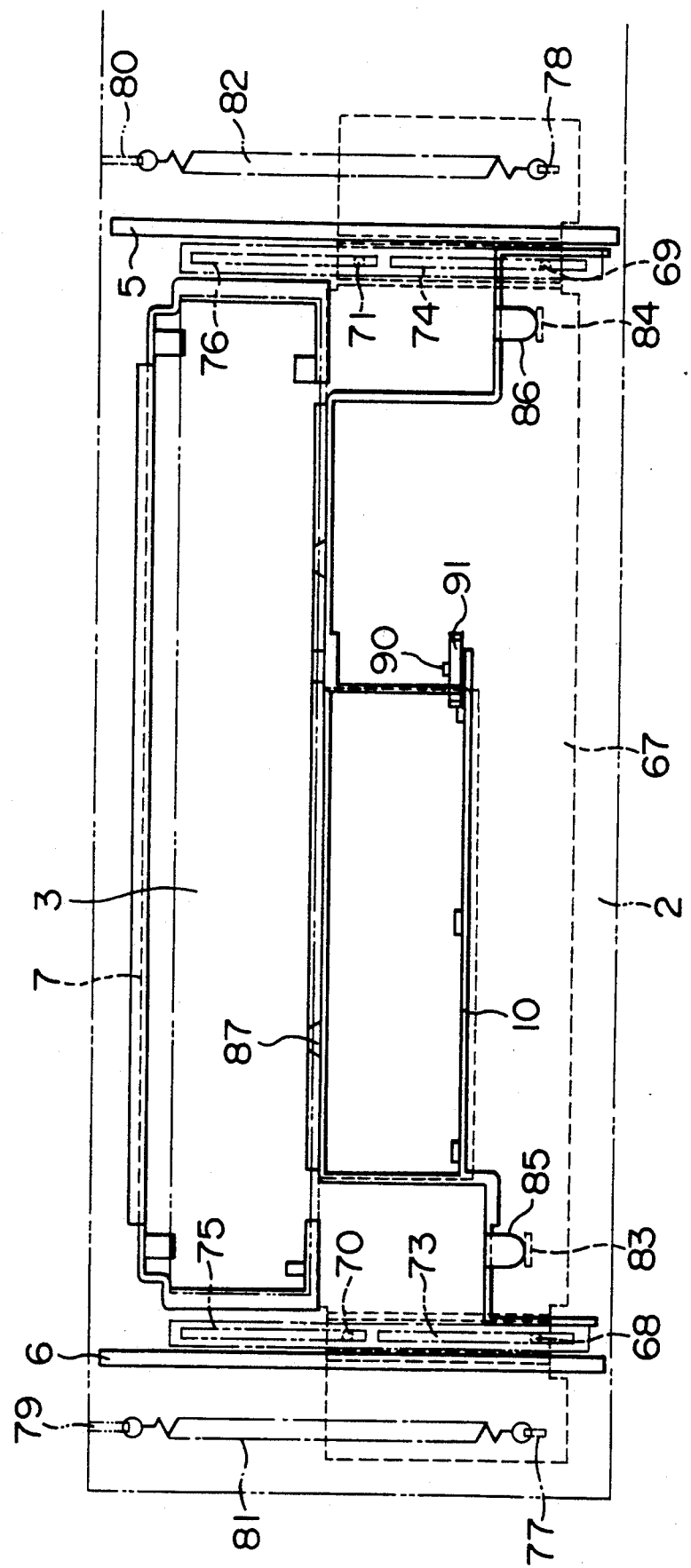
Figure 4:
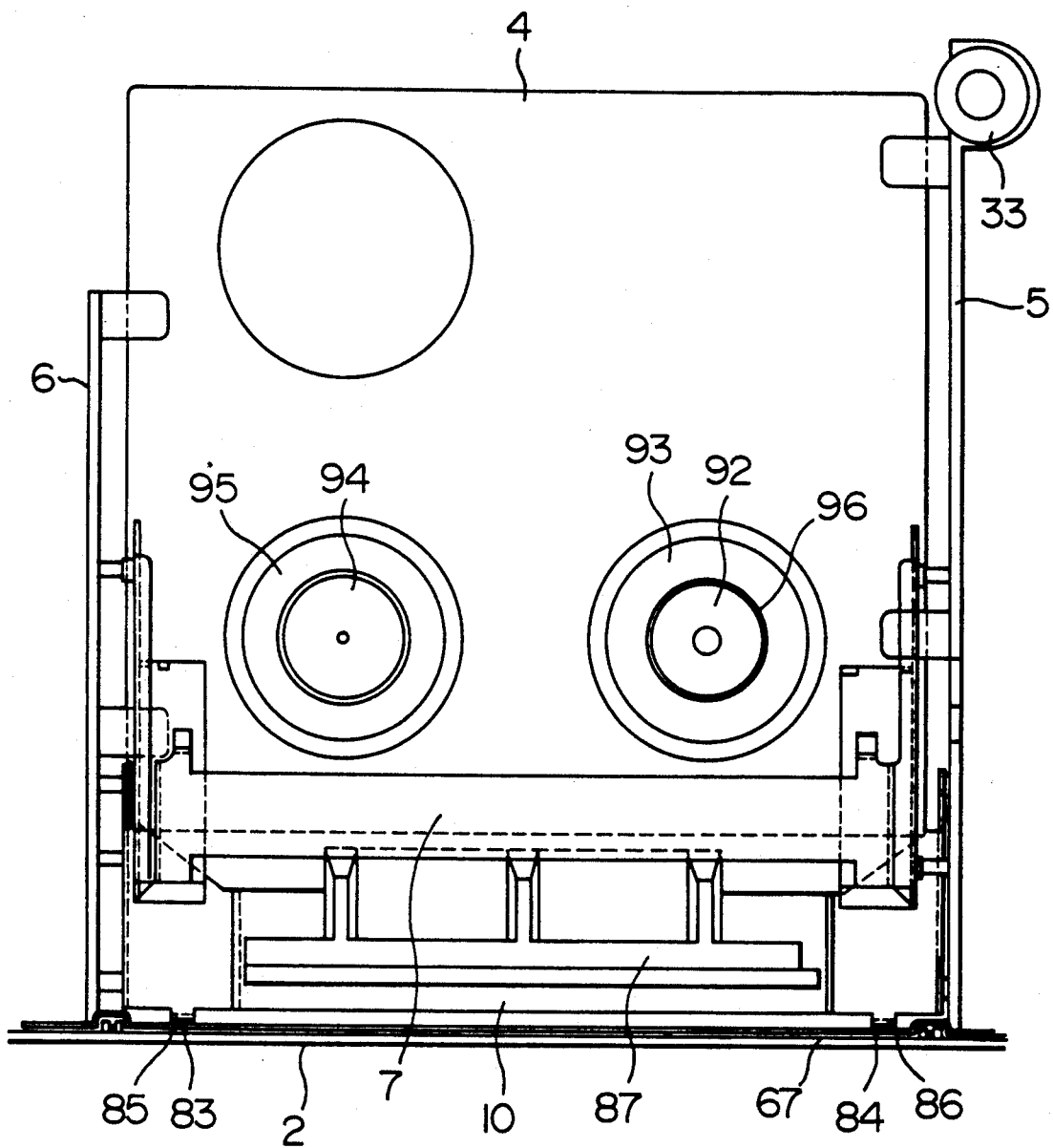
Figure 7:
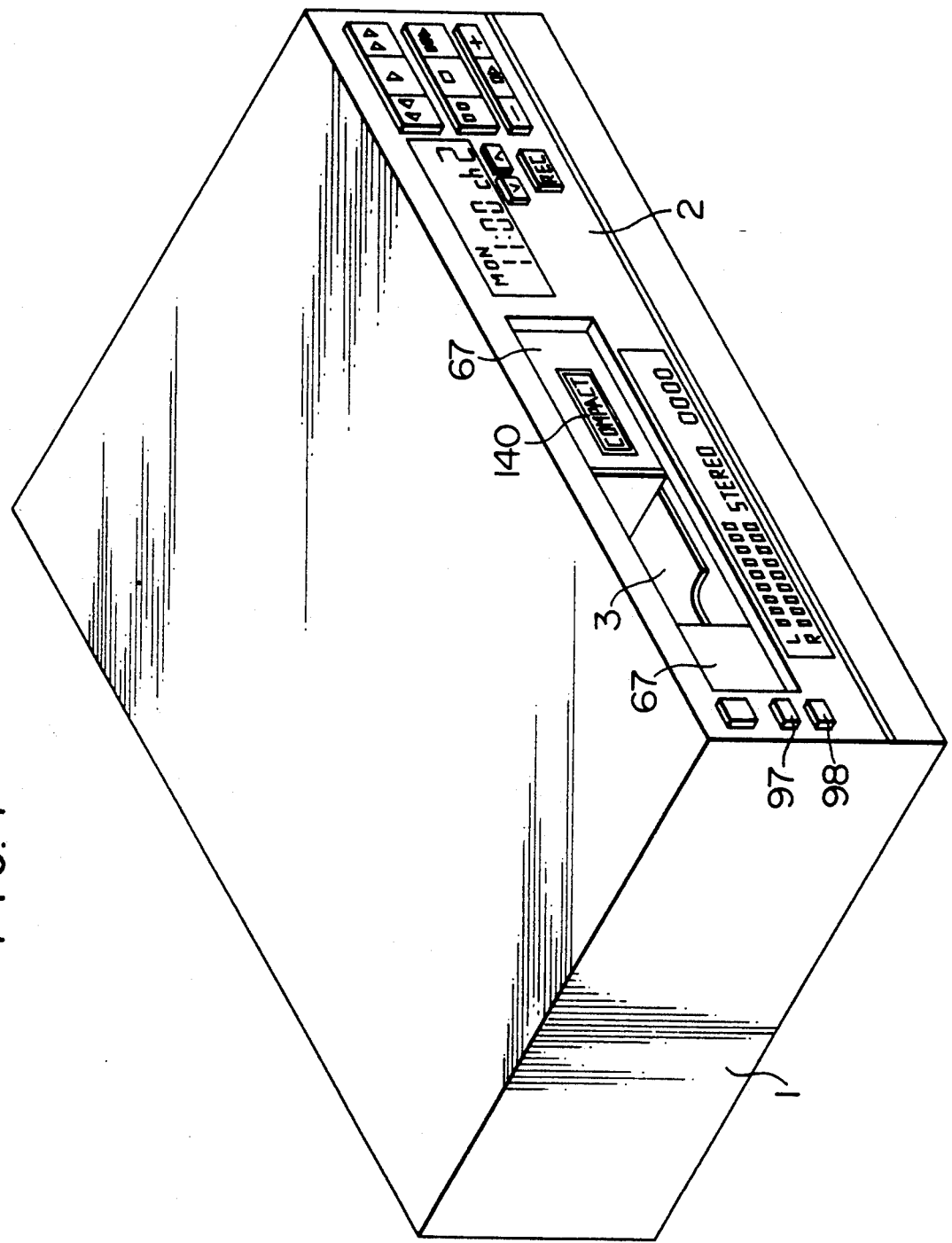

A description will be given hereinunder of a mechanism for changing the size of the effective area of the cassette insertion opening. FIG. 3 is a front elevational view of the apparatus in a standard-type cassette stand-by state. Projections 68, 69, 70 and 71 of a shutter 67 slidably engage with guide grooves 73, 74, 75 and 76 formed in the front panel 2. Tension springs 81 and 82 are stretched between spring retainer portions 77, 78 of the shutter 67 and spring retainer portions 79, 80 on the front panel 2 Projections 83, 84 on the shutter 67 are pressed downward as viewed in FIG. 3 by projections 85, 86 of the miniature tape cassette holder 10, so as to be held at the position shown in FIG. 3. When the miniature tape cassette holder is moved from the position shown in FIG. 2 to the position shown in FIG. 8, the shutter 67 is moved together with the miniature tape cassette holder 10 upward as viewed in FIG. 3 to a position shown in FIG. 10 by the force of the tension springs 81 and 82. In this state, the projections 68 and 69 of the shutter 67 make contact with ends of the guide grooves 73 and 74 in the front panel 2 so as to be retained at a position shown in FIG. 10. FIG. 7 shows the appearance of the apparatus in the state shown in FIG. 10. It will be seen that portions of the area of the tape cassette insertion opening 3 unnecessary for receiving the miniature tape cassette are covered. Letters or patterns displayed on the display portion 140 on the shutter 67 is presented for visual recognition of the user through the tape cassette insertion opening 3 in the front panel 2

A description will be given of the guiding means for the standard-type tape cassette Referring to FIG. 2, a guide member 87 for the standard-type tape cassette 87 is formed on the upper side of the miniature tape cassette holder 10. The guide member 87 is substantially flush with the bottom surface 88 of the standard-type tape cassette holder 7 as will be seen from FIG. 3, so that it can guide the standard-type tape cassette 89 when the same is inserted into the apparatus through the tape cassette opening 3 so that the standard-type tape cassette is received in the standard-type tape cassette holder 7.

The construction of the apparatus will be described with reference to FIGS. 19 to 23. The description will be mainly focused on the constructions of the extraction member, first control member, second control member and third shifting means.

The chassis 4 carries various parts located at predetermined positions, such as guide posts 150, 151, eraser head 152, rotary cylinder 153, AC head 154, capstan 155, supply reel base 156 and the take-up reel base 92. In addition, the chassis 4 is provided with guide grooves 158A, 158B for guiding extraction members 157A, 157B which will be described later. The guide grooves 158A, 158B can take a loading position where the extraction members 157A, 157B are brought to positions in the close proximity to the rotary cylinder 153, a first unloading position where the tape extraction members 157A, 157B are moved into mouths 159A, 159B of the standard-type cassette 89, and a second unloading position where the tape extraction members 157A, 157B move into mouths 160A, 160B of the miniature tape cassette 58. A pinch roller 161 is rotatable and movable up and down by known means which are not described in detail, so as to be pressed onto a capstan 155.

Figure 22:
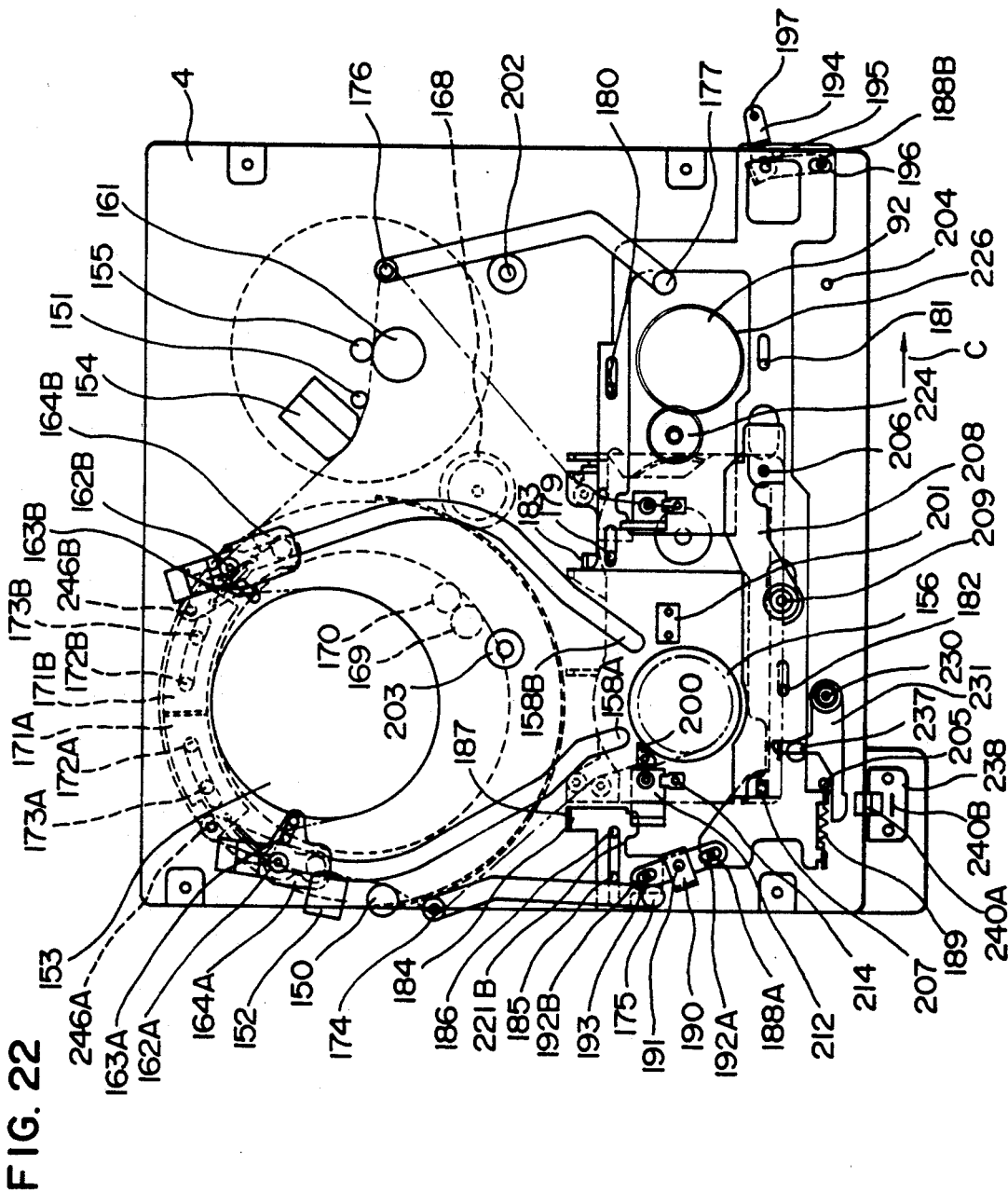
Figure 23:
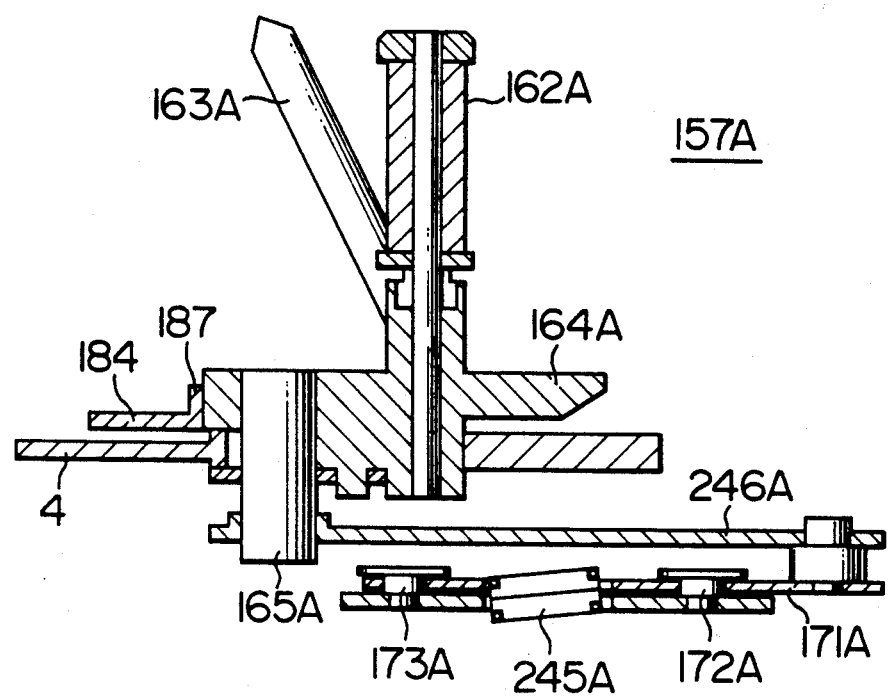
Figure 24:
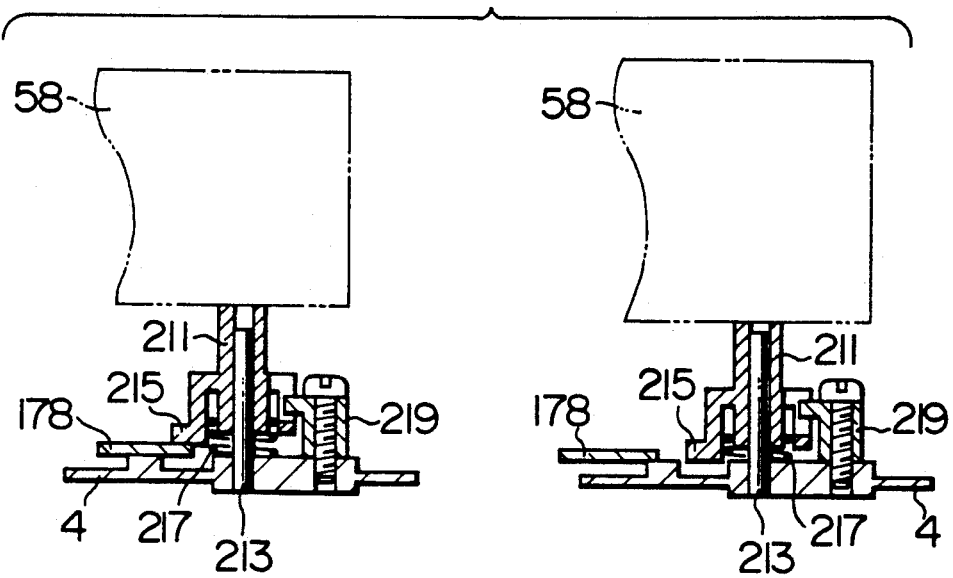

The extraction members 157A, 157B are composed of roller posts 162A, 162B, inclined posts 163A, 163B, shaft holders 164A, 164B, and guide pins 165A, 165B, as shown in FIG. 23. The shaft holder 164A and 164B and the guide pins 165A, 165B are received in guide grooves 158A, 158B formed in the chassis 4. On the other hand, the chassis 4 carries a guide ring S166 and a guide ring T167 coaxial therewith The driving power of a motor (not shown) is transmitted through a stepped gear 168 to the guide ring S166 and then to the guide ring T163 after reversing of the rotation direction through gears A169 and B170. The guide ring S162 is provided with a slide member 171A so as to be slidable in the circumferential direction while being guided by pins 172A, 173A. A bias spring 245 is provided between the guide ring S166 and the slide member 171A so as to always bias the slide member 171A in the direction of the arrow D. The slide member 171A is connected to the guide pin 165A on the extraction member 157A through a connector plate 246. The extraction member 157B, which is connected to the guide ring T163, is not described in detail because its construction is materially the same as that of the extraction member 157A. A tension post 174 is rotatable about a support shaft 175, so as to take an operative position (see FIGS. 20 and 22), a position where it is received in the mouth 159A of the standard-type tape cassette 89 (see FIG. 19) and a position where it is received in a mouth portion 160A of the miniature tape cassette 58 (see FIG. 21). Similarly, an extraction post 176 is rotatable about the axis of a support shaft 177 to take an operative position (see FIGS. 20 and 22), a position where it is received in the mouth 159B of the standard-type tape cassette 89 (see FIG. 19) and a position where it is received in the mouth 160C of the miniature tape cassette 58

Figure 20:
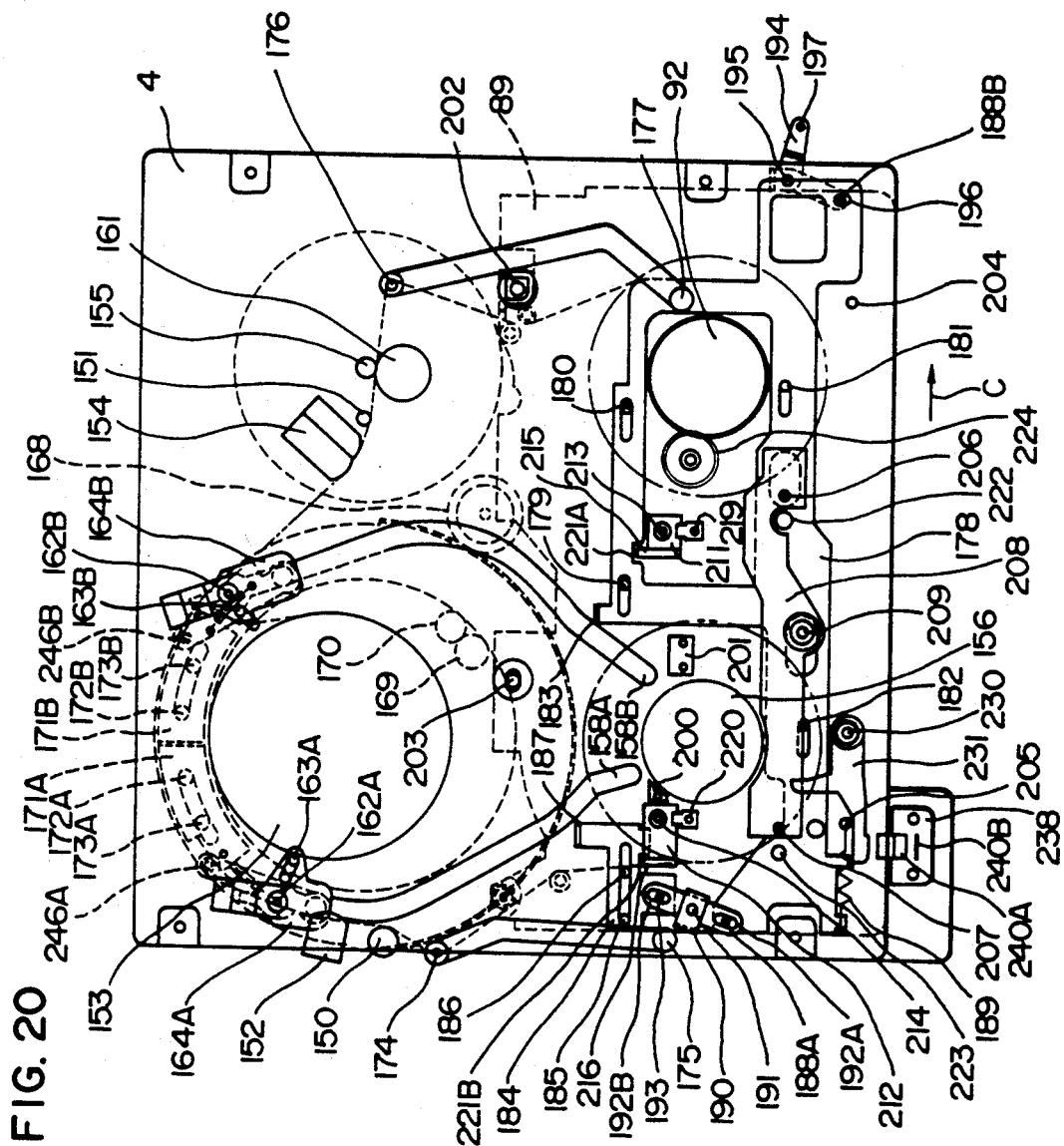
Figure 21:
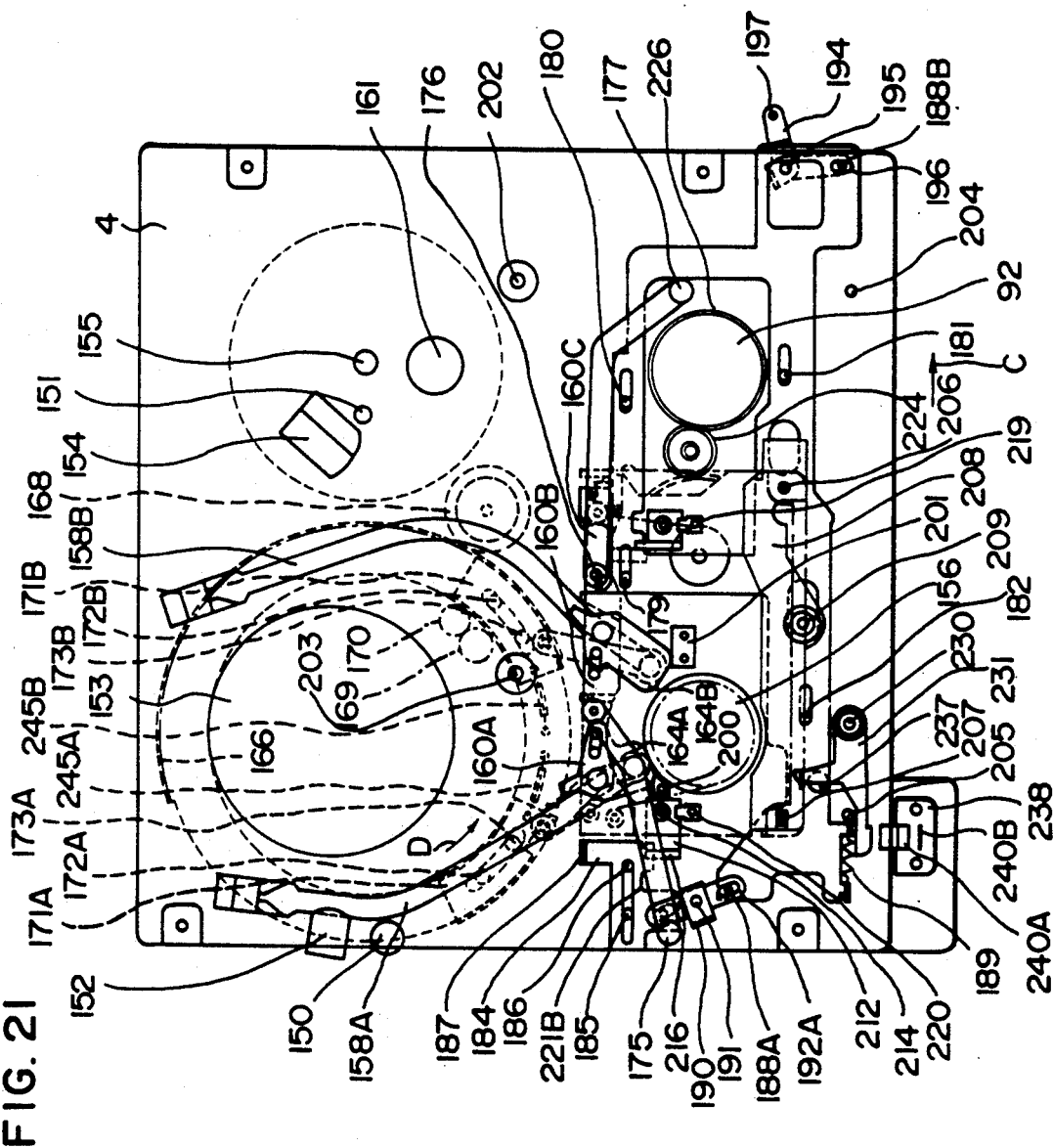

A first rod 178 is slidable while being guided by pins 179, 180, 181 and 182 between an operative position where a bent portion 183 thereof limits the position of the shaft holder 164B of the extraction member 157B (see FIGS. 19 and 20) and an inoperative position where it does not limit the position of the shaft holder 164B of the extraction member 157B (see FIGS. 21 and 22). Similarly, a second rod 184 is slidable while being guided by pins 185, 186 between an operative position where a bent portion 187 thereof limits the position of the shaft holder 164A of the extraction member 157A (see FIGS. 19 and 20) and an inoperative position where it does not limit the position of the shaft holder 164A of the extraction member 157A (see FIGS. 21 and 22). The first rod 178 is provided with pins 188A, 188B and is biased in the direction of an arrow C by a bias spring 189. A conversion lever 190 is rotatable about the axis of a support shaft 191 and is provided at its both ends with elongated holes 192A, 192B which receive, respectively, the pin 188A on the first rod 178 and the pin 193 on the second rod 184. Therefore, the conversion lever 190 is capable of causing the first rod 178 and the second rod 184 to move in opposite directions.

An L-shaped lever 194 is rotatable about the axis of a support shaft 195. An elongated hole 196 provided in one of two plate portions of the L-shaped lever 194 receives the pin 18B on the first rod 178, while the other plate portion carries a pin 197 provided thereon. The pin 197 abuts against a bent portion (not shown) of the slide lever 47 so that it can transmit the movement of the slide lever 47 to the first rod 178. The first rod 178 and the second rod 184 in combination provide a first control member 198. The first rod 178, the second rod 184, the conversion lever 190 and the L-shaped lever 194 in cooperation provide a third shifting means 199. Second control members 200, 201 are provided on the chassis 4 at positions where they limit the movement of the shaft holders 164A and 164B.

A description will be given of the locating means. Locating pins 202 and 203 determine the position of the standard-type tape cassette 89 in the horizontal plane with respect to the chassis 4. The height of the standard-type tape cassette 89 with respect to the chassis 4 is determined by cooperation between the standard-type tape cassette locating pins 202, 203 and heightwise locating pins 204, 205. Thus, the standard-type tape cassette locating pins 202, 203 and the heightwise locating pins 204, 205 in cooperation provide a first locating means. As will be understood from FIGS. 21 and 22, the first locating means is positioned so as not to horizontally interfere with the miniature tape cassette 58. Miniature tape cassette locating pins 206, 207 are fixed to predetermined portions of a base plate 208. The base plate 208 is vertically slidable relative to a support shaft and is constantly biased upward by a biasing spring 210. Although not shown, a stopper is provided to prevent the base plate 208 from rotating about the axis of the support shaft 209. Miniature tape cassette heightwise locating members 211, 212 are slidable up and down relative to respective support shafts 213, 214 and are provided with projections 215, 216. The miniature tape cassette heightwise locating members 211, 212 are constantly biased upward by biasing springs 217, 218. Drop prevention members 219, 220 are capable of preventing the miniature tape cassette heightwise locating members 211, 212 from coming off while fixing them against rotation about the axes of the support shafts 211, 212. The miniature tape cassette locating pins 206, 207, base plate 208, support shaft 209, biasing spring 210, miniature tape cassette heightwise locating members 211, 212, support shafts 213, 214, biasing springs 217, 218 and the drop prevention members 219, 220 in combination provide second locating means. The first rod 178 is provided with a notch 221 at a portion thereof corresponding to the projection 215 of the miniature tape cassette heightwise locating member 211 and has spacer pins 222, 223 provided on a portion thereof corresponding to the base plate 208.

Figure 27:
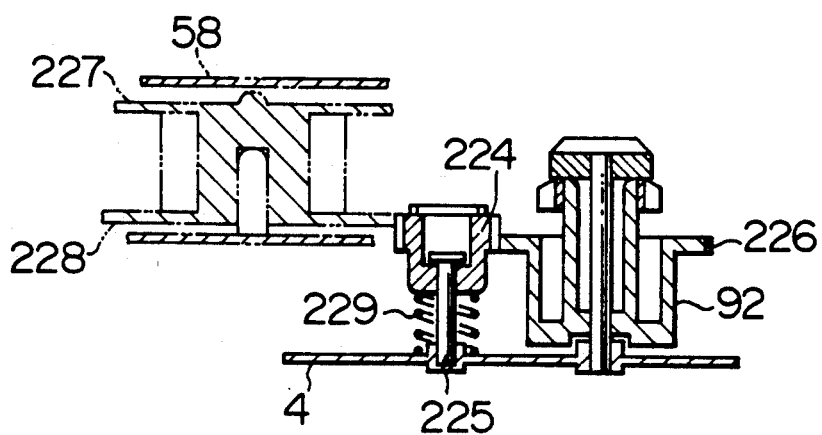
Figure 28:
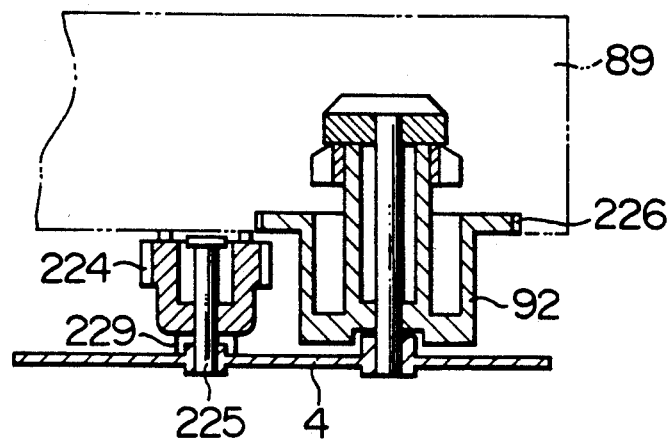

A description will be given of a connecting means, with reference to FIGS. 27 and 28. The connecting means has a connection gear 224 slidable and rotatable with respect to the support shaft 225 Thus, the connecting gear is movable between an operative position (see FIG. 27) where a gear 226 on the take-up reel base 92 engages with a rotary member 228 provided on the take-up reel 227 of the miniature tape cassette 58, and an inoperative position (see FIG. 27) where it does not engage with the gear 226 on the take-up reel base 92. The connection gear 224 is constantly biased upward by a biasing means 229. The connection gear 224 and the support shaft 225 in cooperation provide the connecting means.

Figure 31:
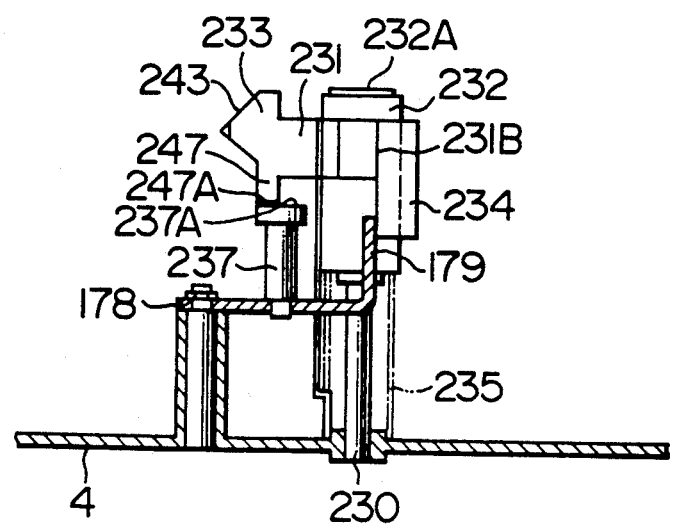

A description will be given of an anti-erasure claw detection device Referring to FIG. 29, the anti-erasure claw detection device has a conversion lever 231 which is rotatable about the axis of a lever support shaft 230 provided on the chassis 4 and slidable along the lever support shaft 230 up and down along the lever support shaft 230. As will be seen from FIG. 29, the conversion lever 231 has a bearing portion 232, a claw engaging portion 233 and an operating portion 234 As will be seen from FIG. 31, the claw engaging portion 233 has a tapered form. A torsion compression spring 235 is provided on the chassis 4 in engagement with the lower end surface of the conversion lever 231 so as to bias the conversion lever 231 upward as viewed in FIG. 31 and clockwise as viewed in FIG. 29. The upward movement of the conversion lever 231 as viewed in FIG. 31 is limited by a stopper 236 which is fixed to the lever support shaft 230. Thus, the operating portion is composed of the lever support shaft 230, conversion lever 231, torsion compression spring 235 and the stopper 236.

Figure 29:
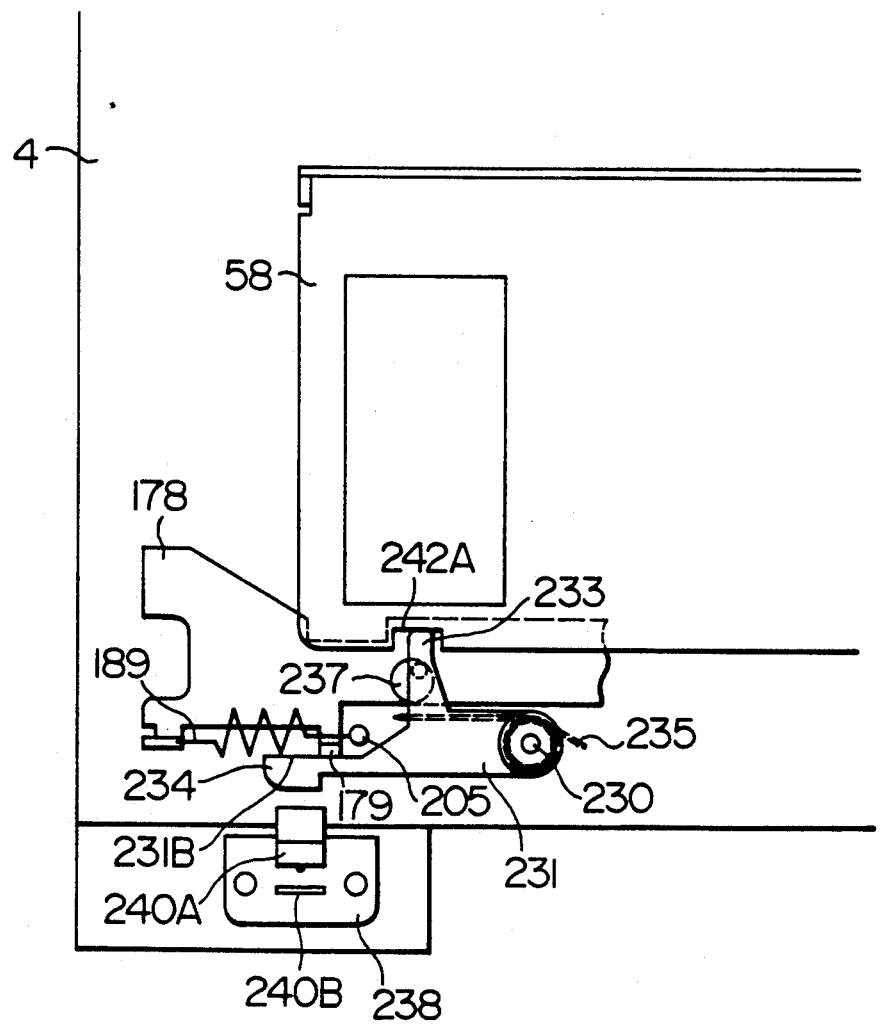
Figure 30:
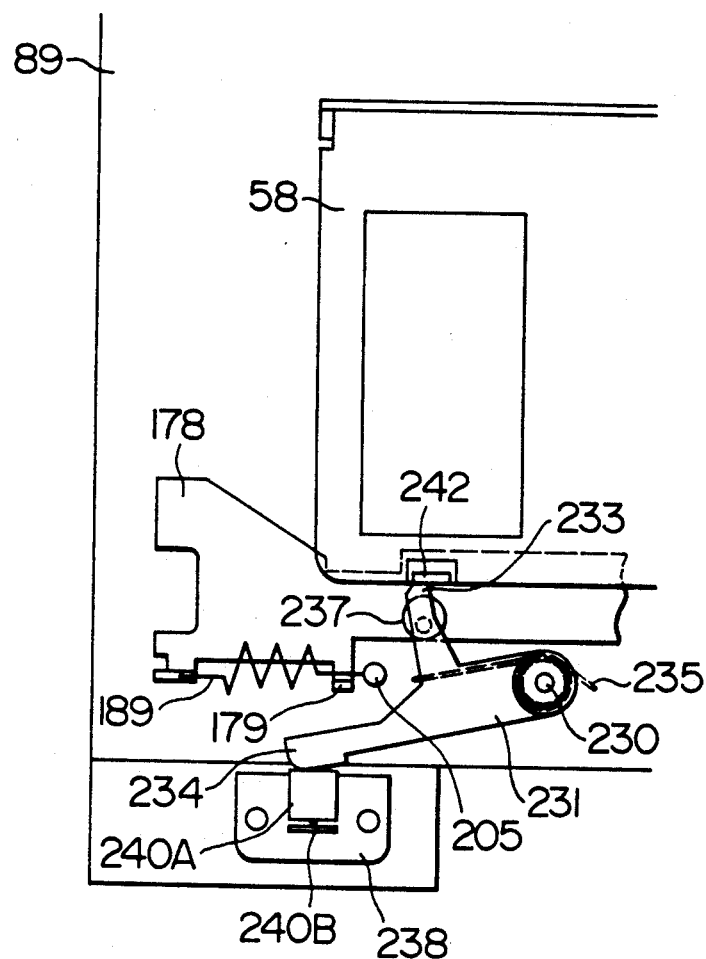
Figure 32:
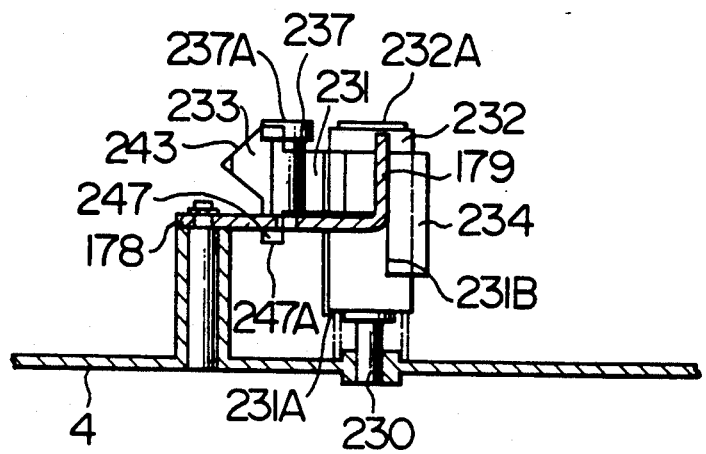
Figure 33:
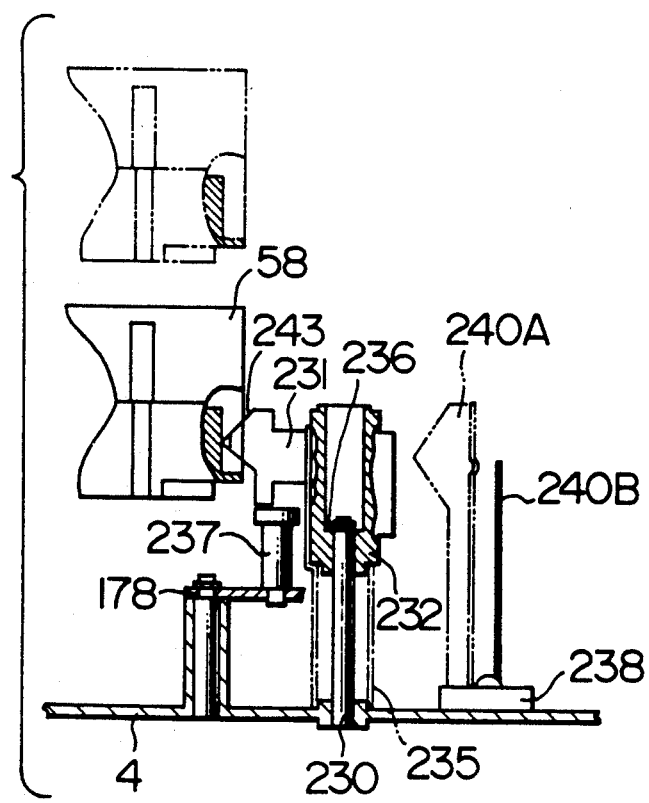
Figure 34:
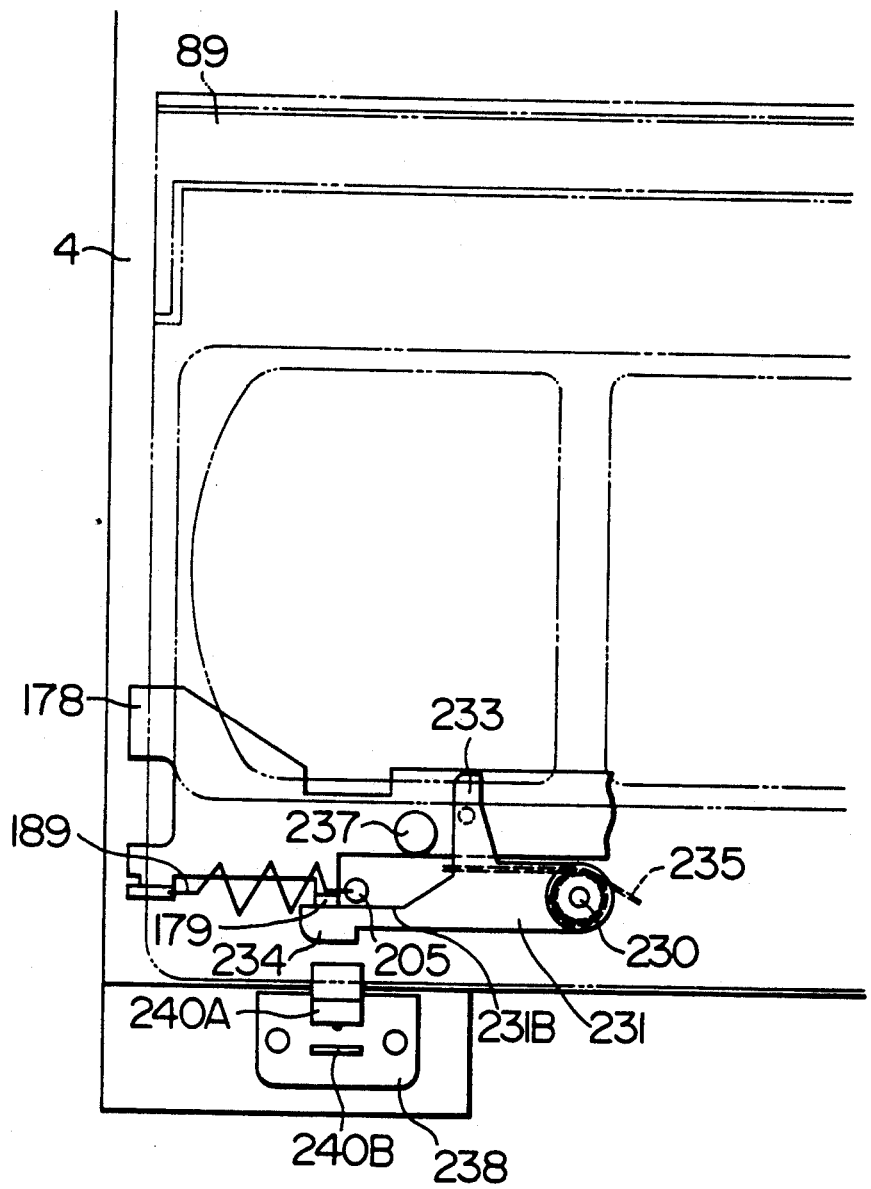
Figure 35:
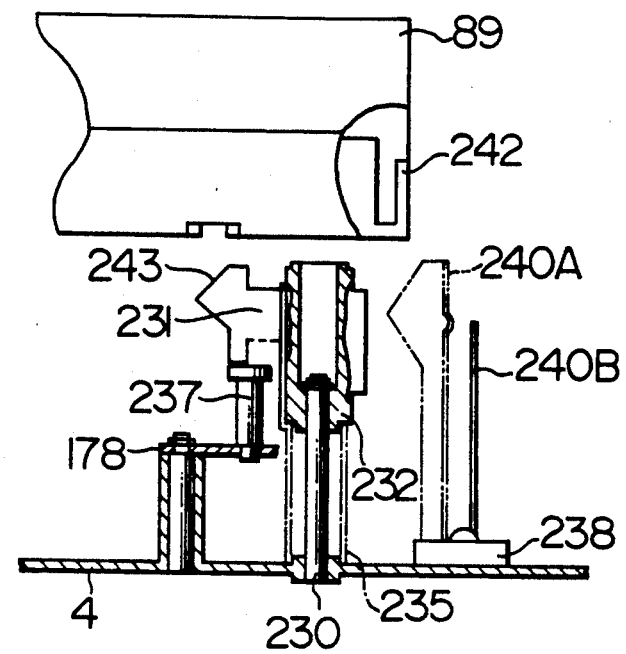

The control portion 179 of the first rod 178 makes contact with one end surface 231B of the conversion lever 231 as shown in FIGS. 29 and 34, so as to limit the conversion lever 231 against clockwise rotation which may otherwise be caused by the torsion compression spring 235. A retainer pin 237 provided on the first rod 178 is movable as a unit with the first rod 178. When the first rod 178 is set at the position shown in FIG. 29, the upper end surface 237A of the retaining pin 237 makes contact with the lower end surface 247A of the retaining portion 247 projected from the conversion member 231. In this state, the conversion lever 231 is regulated to the height shown in FIG. 31 and is not allowed to move downward In the state in which the first rod 178 has been moved from the position shown in FIG. 29 leftward to the position shown in FIG. 34, the retaining portion 247 of the conversion lever 231 is out of engagement with the retaining pin 237, so that the conversion lever 231 is allowed to move in the direction of contraction and expansion of the compression spring 35 (vertical direction) as shown in FIG. 32. Detecting means 238 is provided at a position which is spaced by a predetermined distance from the operating portion 234 of the conversion lever 231 The detecting means 238 which is located at this position does not hinder the operation for mounting the standard tape cassette 89 on the tape driving means. The detecting means 238 is composed of a terminal 240A and a terminal 240B. An anti-erasure claw can be detected through mutual contact of the terminals 20A and 20B.

The operation of this embodiment is as follows. The description will commence with the operation of a cassette mounting mechanism for mounting the standard-type tape cassette or the miniature tape cassette.

Figure 5:
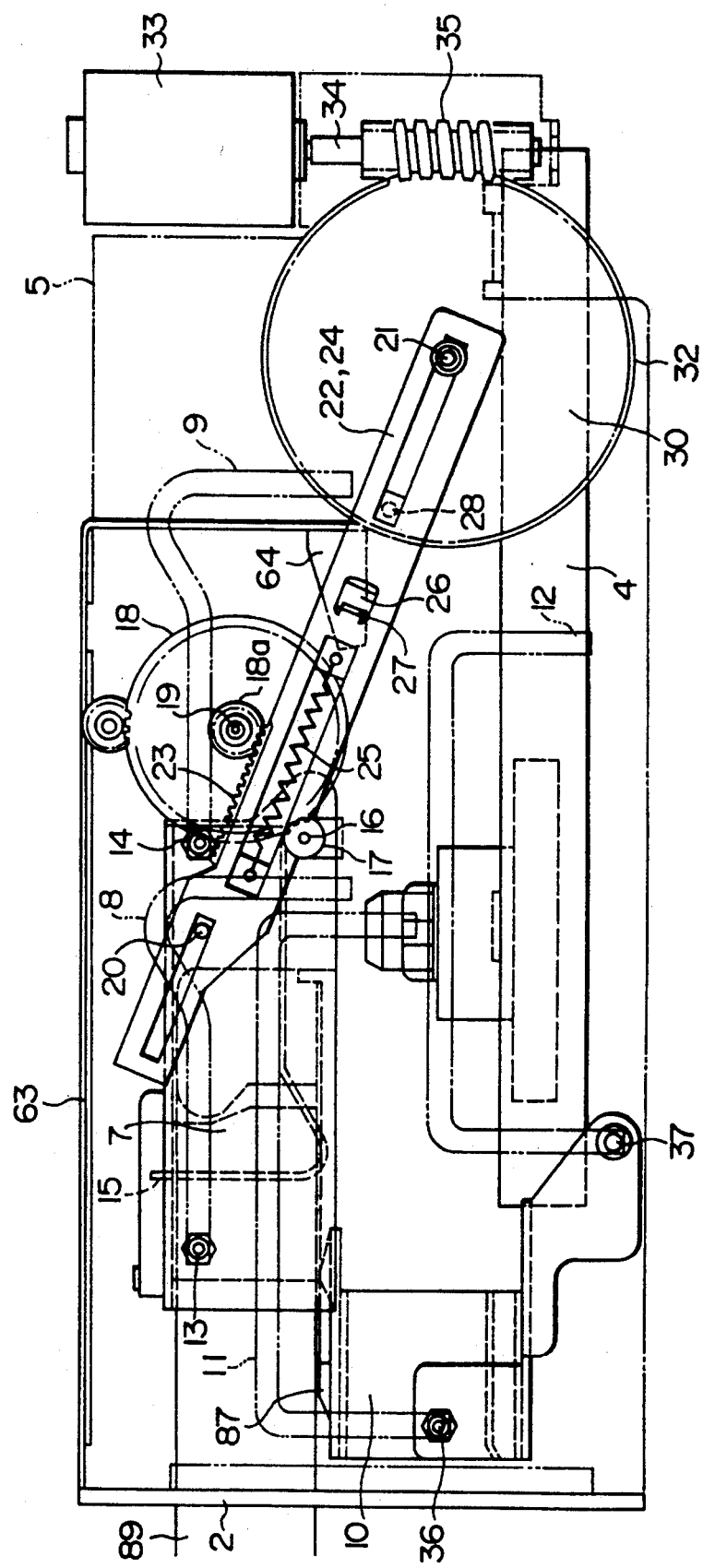
Figure 6:
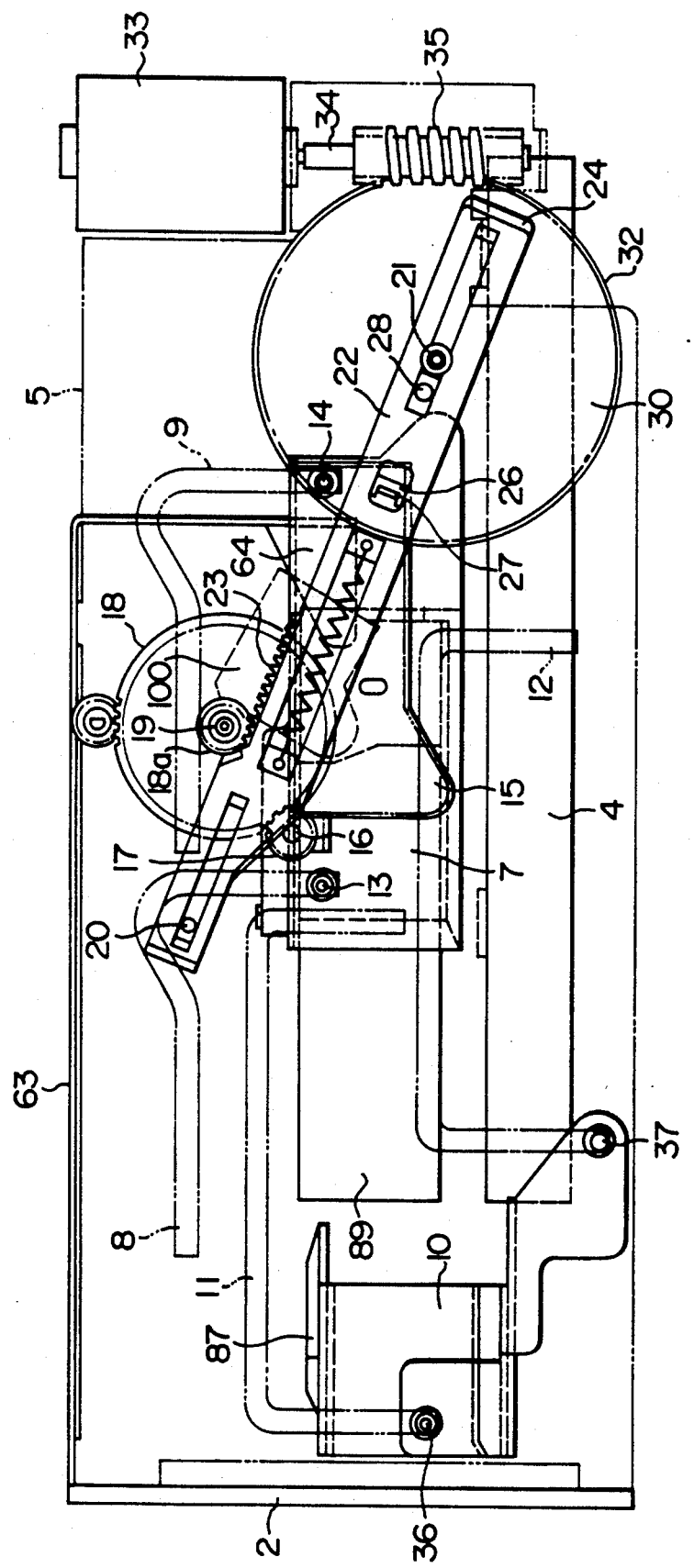

The standard-type tape cassette 89 is mounted in a manner which will be explained below. The perspective view in FIG. 1 and the side elevational view in FIG. 2 show the apparatus in the standard-type tape cassette stand-by state ready for mounting of the standard-type tape cassette FIG. 5 shows the state of the apparatus with the standard-type tape cassette inserted into the standard-type tape cassette holder 7 through the cassette insertion opening 3. The insertion of the standard-type tape cassette 89 into a predetermined portion of the standard-type tape cassette holder 7 is detected by a standard-type tape cassette detection means (not shown). As a result, the driving motor 33 is started so as to drive the cam gear 30 clockwise. The cam gear 30 is provided with the first cam groove (not shown) having a stroke as shown in the cam diagram showing in FIG. 18, so that the slide lever 24 having the cam follower 28 engaging with the first cam groove is made to slide to the right as viewed in FIG. 5. In consequence, the slide lever 22, having the hole 26 engaging with the projection 27 of the slide lever 24 also is made to slide to the right as viewed in FIG. 5, so that the gear 18 which has the pinion 18a meshing with the rack 23 of the slide lever 22 is driven to rotate counter-clockwise with the result that the pinion gear 17 engaging with the gear 18 is rotated clockwise. This causes the standard-type tape cassette holder 7, having the, rack 15 meshing with the pinion gear 17, to move rightwardly as viewed in FIG. 5 along the guide grooves 8, 9 to the position shown in FIG. 6, whereby the standard-type tape cassette 89 is mounted on the apparatus. In this state, the front lid 100 of the standard-type tape cassette 89 is placed on the lid-opening portion 64 provided on the upper plate 63, so as to be kept opened as shown in FIG. 6. A further rotation of the shaft of the driving motor 33 causes the slide lever 24 to further move to the right but the slide lever 22 is not allowed to move any more because the standard-type tape cassette has already been mounted. In consequence, the projection 27 of the slide lever 24 and the hole 26 of the slide lever 22 are moved apart so that the biasing force of the tension spring 25 acts on the slide lever 22 thereby pressing the standard-type tape cassette 89 onto the chassis 4.

Demounting of the standard-type tape cassette from the apparatus is conducted in the following manner When a cassette ejector button 97 provided on the front panel 2 is pressed, the driving motor 33 operates in the state shown in FIG. 6 so that the cam gear 30 is rotated counter-clockwise. In consequence, an operation reverse to the described mounting operation is executed so that the standard-type tape cassette holder 7 is moved from the position shown in FIG. 6 to the position shown in FIG. 5. In the state shown in FIG. 5, the user can extract the standard-type tape cassette 89 out of the apparatus 1 by pinching a portion of the cassette 88 projected out of the apparatus 1.

Subsequently, a description will be given of the manner in which the miniature tape cassette is mounted on the apparatus.

The user pushes a tape cassette selection button 98 while the apparatus is in the standard-type tape cassette stand-by state shown in FIGS. 1 and 2, so that the driving motor 33 starts to operate so as to drive the cam gear 30 to rotate it counter-clockwise. The cam gear 30 is provided with the second cam groove (not shown) having the stroke as shown in FIG. 18. The counter-clockwise rotation of the cam gear 30 from the state shown in FIG. 2 means that the rotation angle is changed from 0° in the minus direction as viewed in FIG. 18. The second cam groove has a stroke in the rotation angle range of 0° to 60° so that the slide lever 47, which has the cam follower 50 slidingly engaging with the second cam groove, is made to slide to the right as viewed in FIG. 2. In consequence, the slide lever 45 having the projection 48 engaging with the hole 49 of the slide lever 47 also is made to slide to the right, with the result that the gear 42 meshing with the rack 46 of the slide lever 45 is rotated counter-clockwise as viewed in FIG. 2. In consequence, the driving arm 39 having the gear 41 meshing with the gear 42 is rotated clockwise, so that the miniature tape cassette holder 10 having the groove 40 engaging with the projection 36 is moved along the position shown in FIG. 8 along the guide groove 11. On the other hand, the shutter 67 is held in the position shown in FIG. 3 because it is urged against the force of the tension springs 81, 82, as the projections 83, 84 thereof are pushed by the projections 85, 86 of the miniature tape cassette holder 10. However, as the miniature tape cassette holder 10 is moved to the position of FIG. 8, the shutter is moved to the position shown in FIG. 10 by the force of the tension springs 81, 82, while being guided by the guide grooves 73, 74, 75 and 76. The apparatus in this state is shown in FIG. 7. It will be seen that the portions of the area of the cassette insertion opening 3 unnecessary for the insertion of the miniature tape cassette are closed by the shutter 67. In this state, the letters or patterns provided on the indicating portion of the shutter 67 are presented for visual confirmation by the user through the tape cassette insertion opening 3 in the front panel 2, so as to inform the user that the apparatus is ready for use of the miniature tape cassette This eliminates any risk of insertion of the standard-type tape cassette. As the cam gear 30 further rotates from the position of FIG. 8 counter-clockwise to the angle of 100°, the standard-type tape cassette holder 7 is moved to the position shown in FIG. 9 by the stroke of the first cam groove as shown in FIG. 18. In this state, the driving arm 131 is driven in the counter-clockwise direction as viewed in FIG. 9 by the projection 13 of the standard-type tape cassette holder 7, so that the retaining lever 134 engaging with the driving arm 131 is moved downward as viewed in FIG. 9 so as to close the guide groove 11 in the miniature tape cassette holder 10. Further rotation of the cam 30 to 120° position causes the second cam groove to have a stroke which allows the slide lever 47 to rotate to the left as viewed in FIG. 9. In consequence, the driving arm is likely to rotate counter-clockwise as viewed in FIG. 9. However, since the guide groove 11 has been closed by the retaining lever 134, the projection 36 of the miniature tape cassette holder 10 abuts against the retaining lever 134 so that the slide lever 45 is prevented from sliding. In consequence, the projection 48 of the slide lever 49 is disengaged from the hole 49 of the slide lever 47, and the slide lever 45 is urged to the left as viewed in FIG. 9 by the tension spring 99. The biasing force of the slide lever 45 causes the driving arm 39 to rotate counter-clockwise as viewed in FIG. 9 through the gear 42 so as to press the projection 36 of the miniature tape cassette holder 10 onto the retaining lever 134. As a result, the miniature tape cassette holder 10 is set to the miniature tape cassette stand-by state as shown in FIG. 9.

Figure 10:
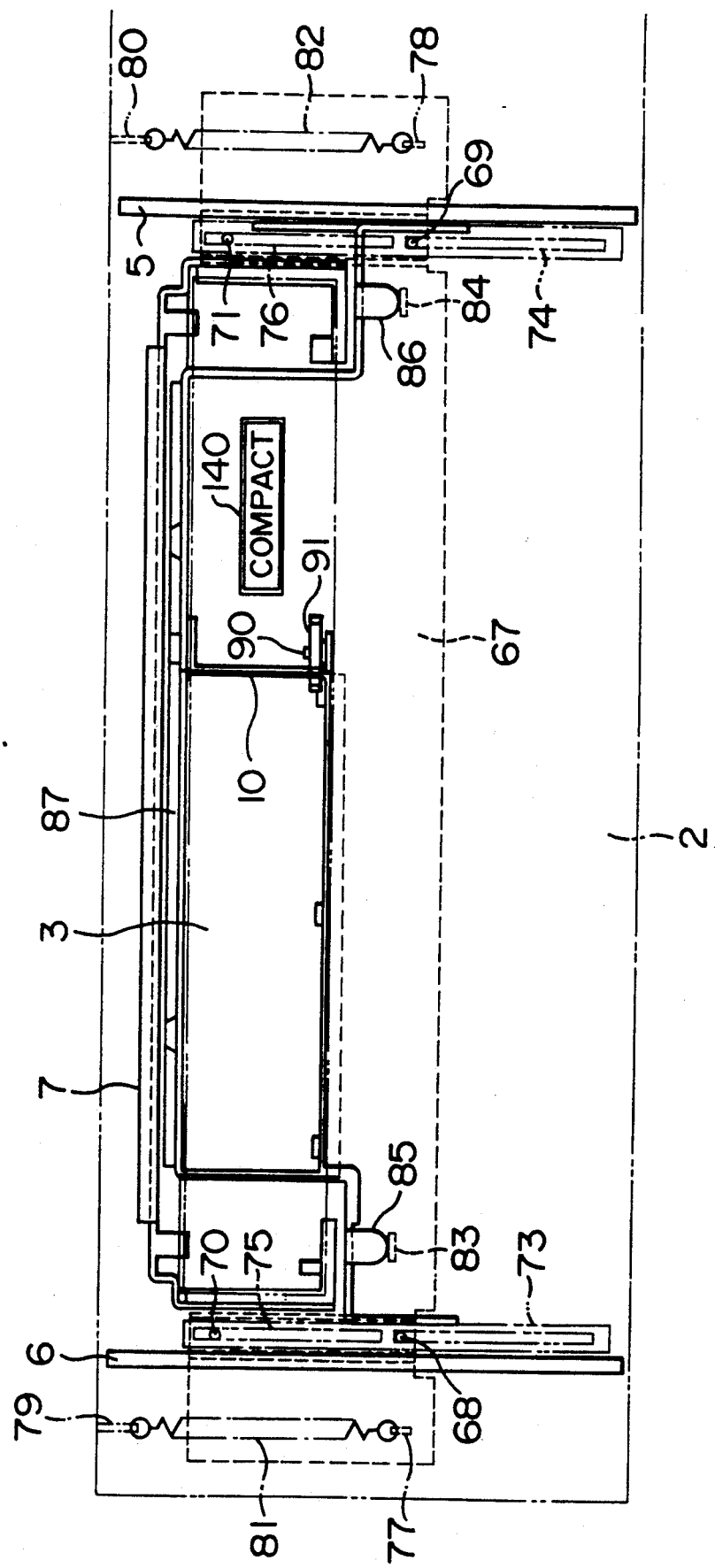
Figure 11:
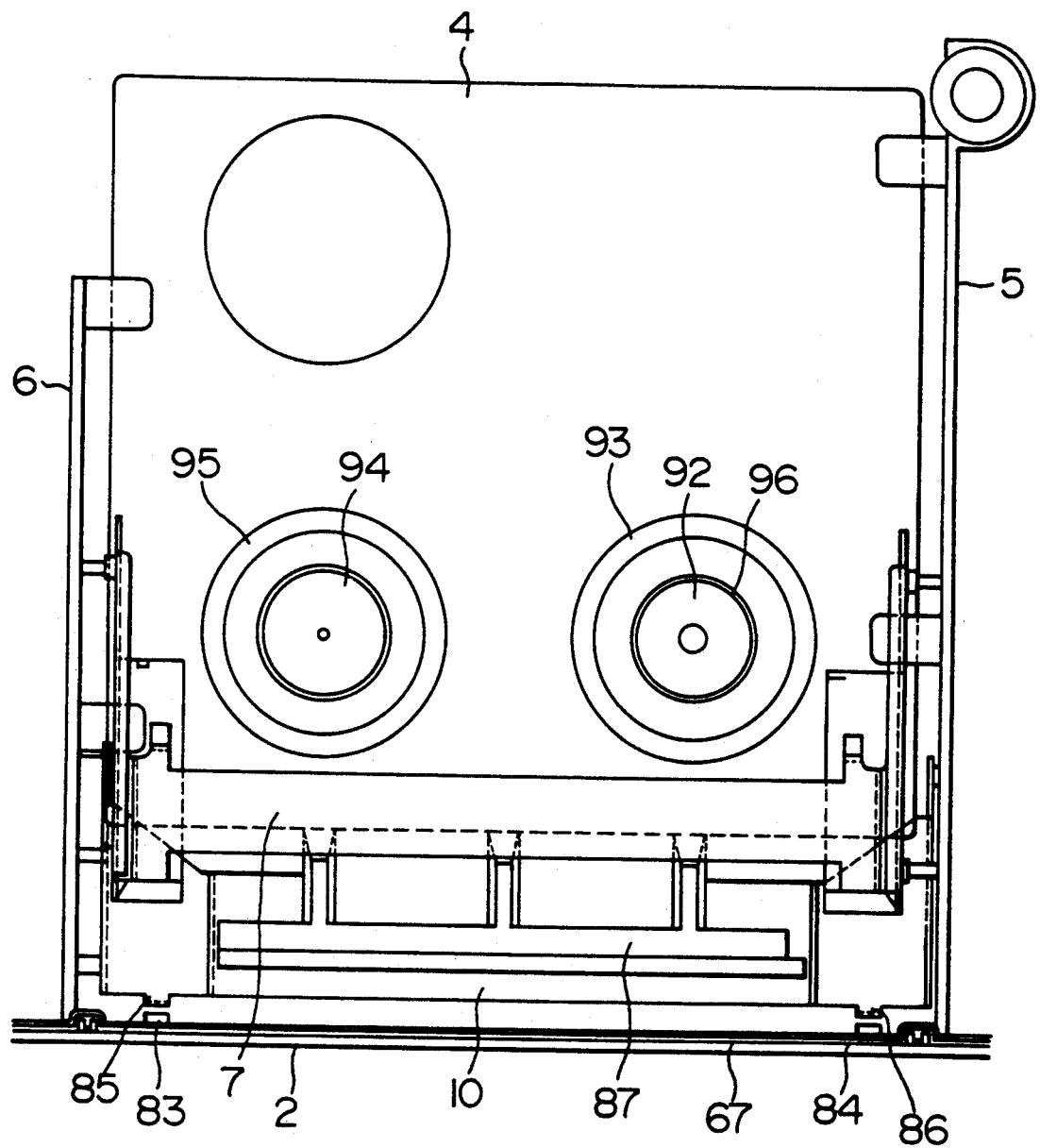

When further counter-clockwise rotation of the cam gear 30 from the state shown in FIG. 2 to 120° position is detected by a mode detection switch (not shown), the driving motor 33 is stopped. The apparatus in this state is shown in FIGS. 9 to 11. Thus, the apparatus is kept in the miniature tape cassette stand-by state.

Figure 12:
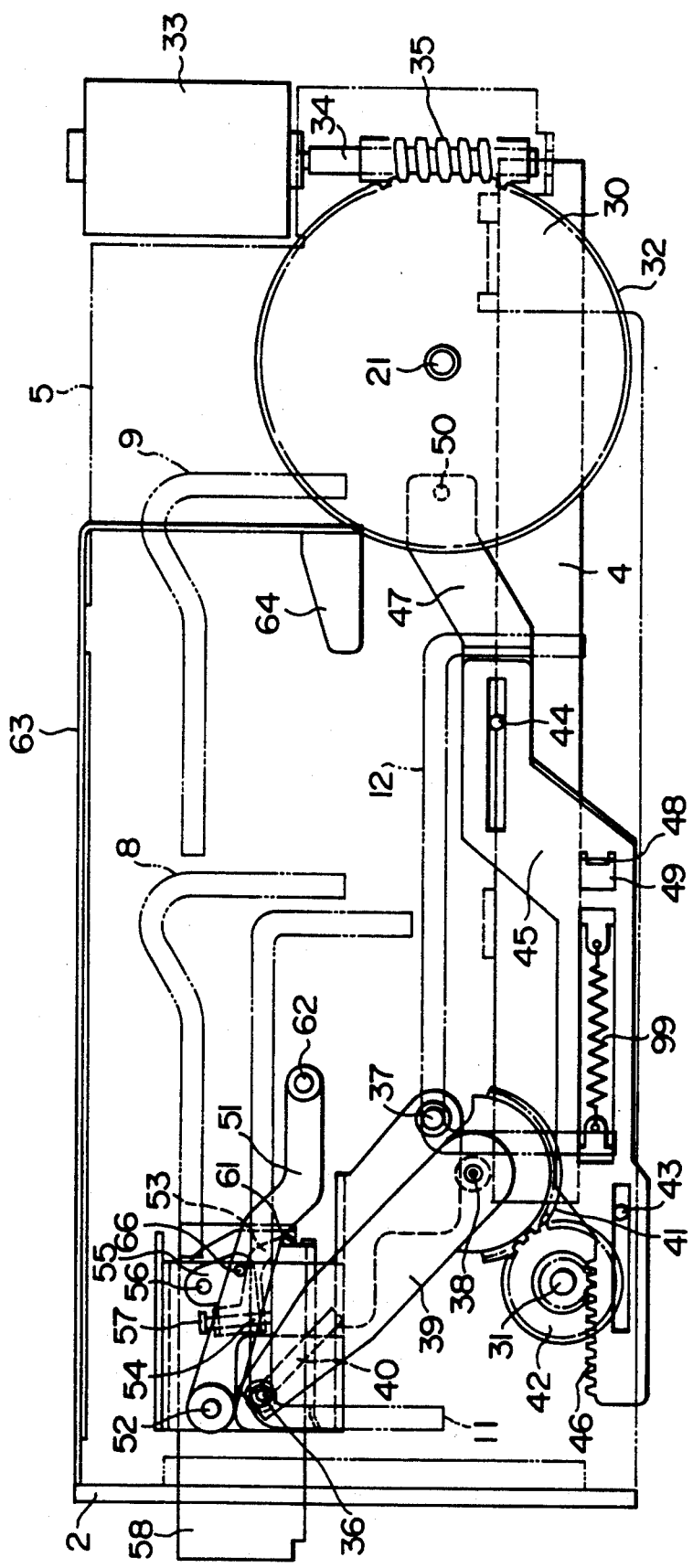
Figure 13:
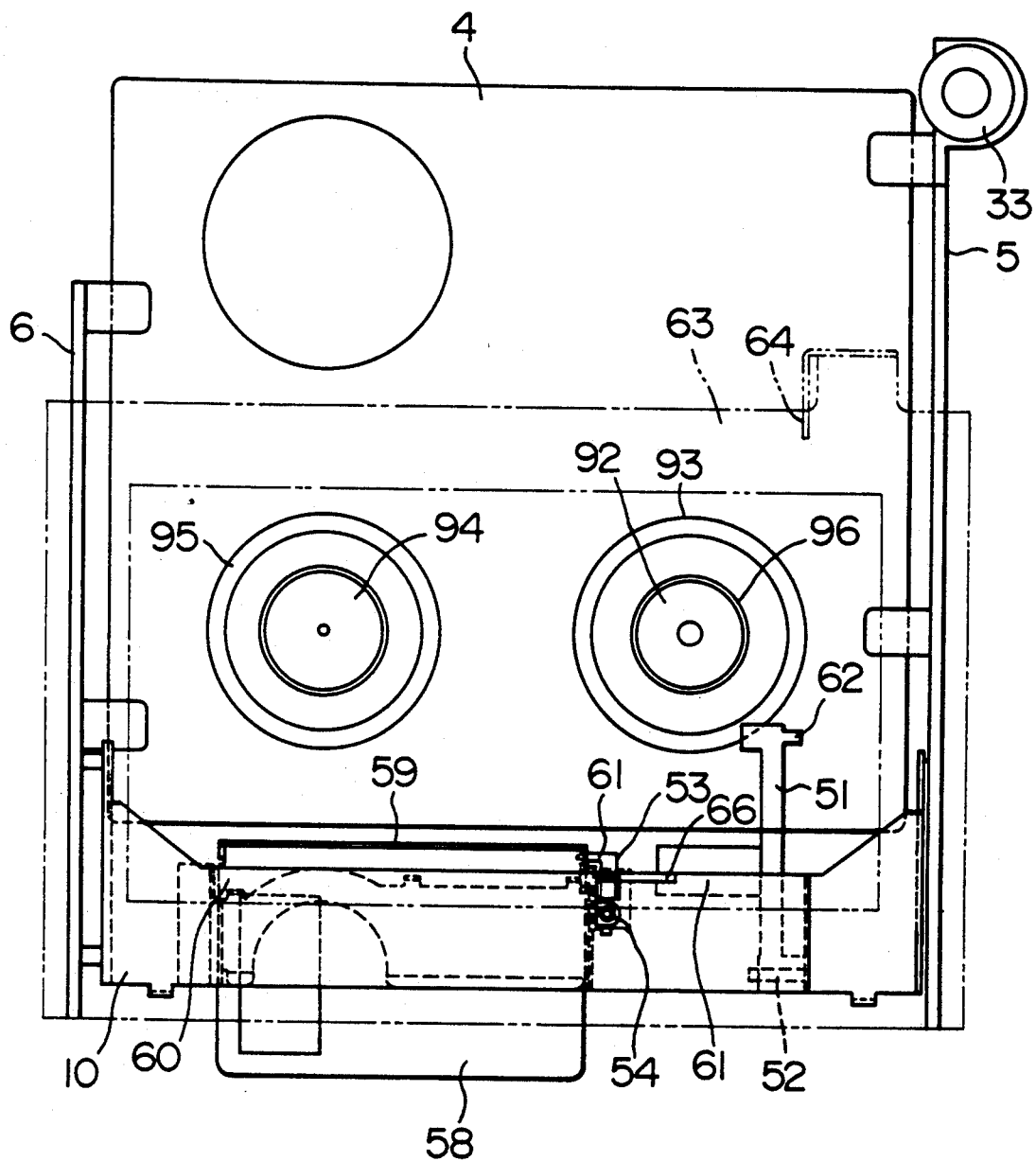
Figure 14:
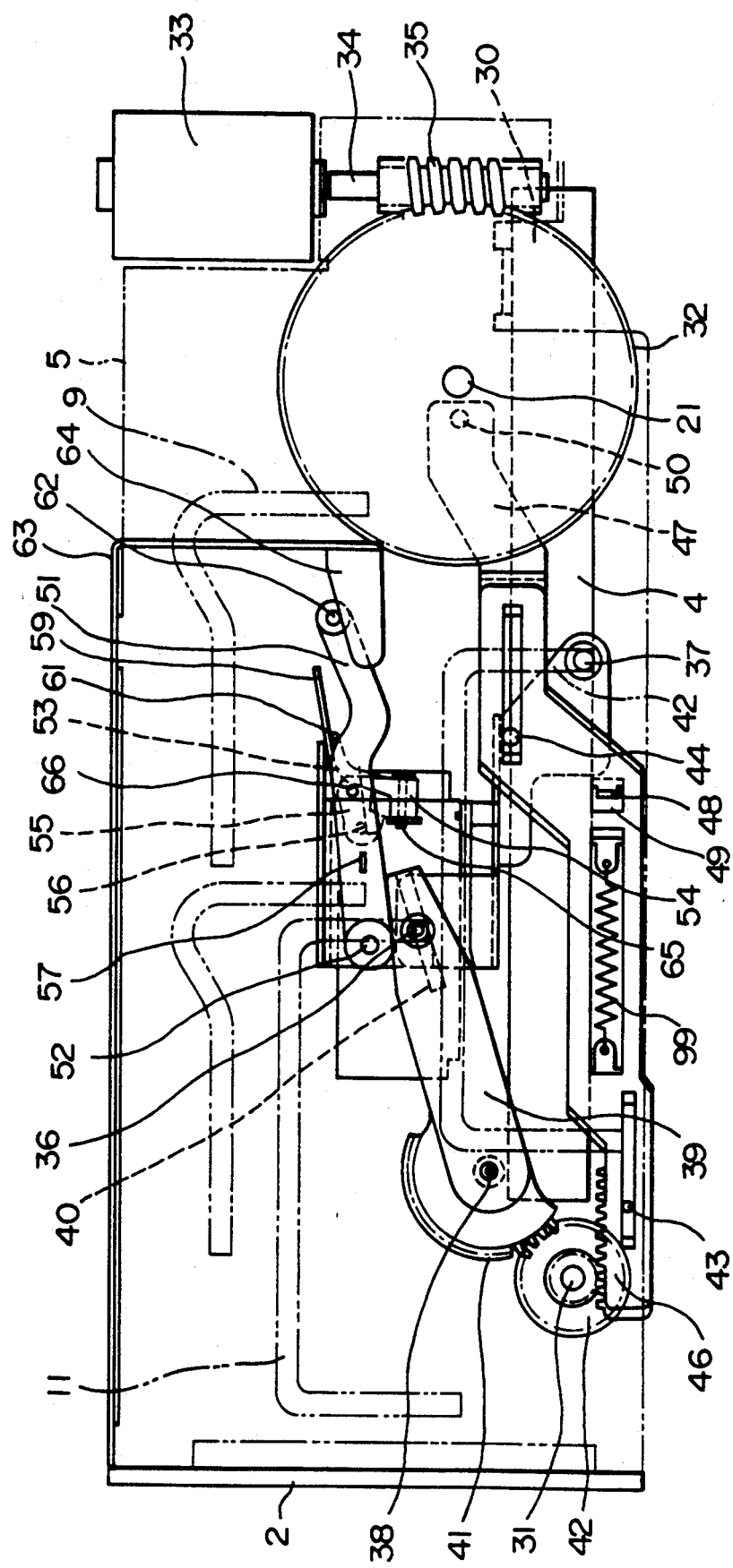

FIGS. 12 and 13 show the apparatus with the miniature tape cassette 58 inserted therein. As will be seen from these Figures, when the miniature tape cassette 58 is inserted into the miniature tape cassette holder 10, the projection 61 of the lid opening lever 53 is inserted into the gap between the main part 60 of the tape cassette 58 and the front lid 59.

Figure 15:
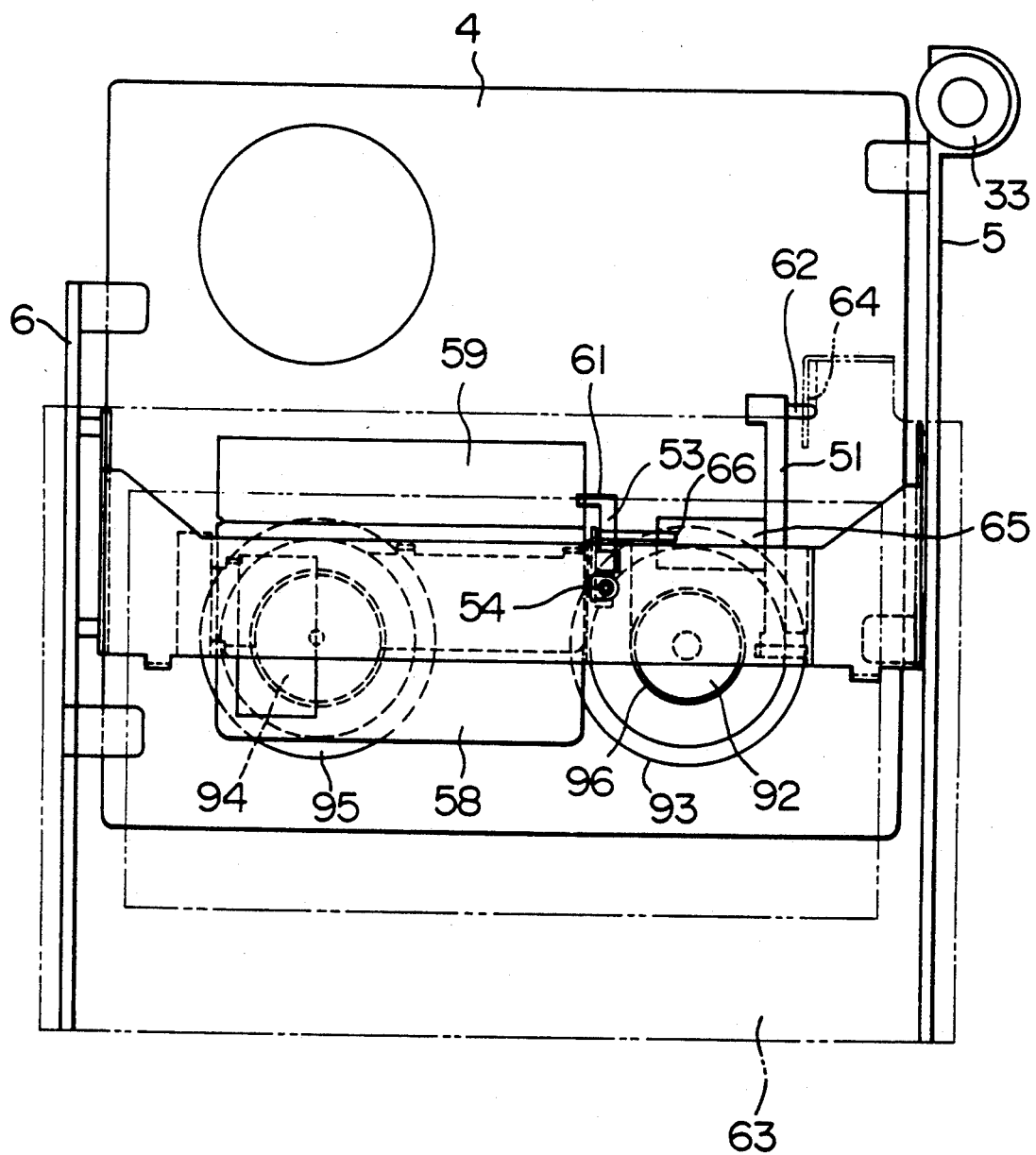
Figure 16:
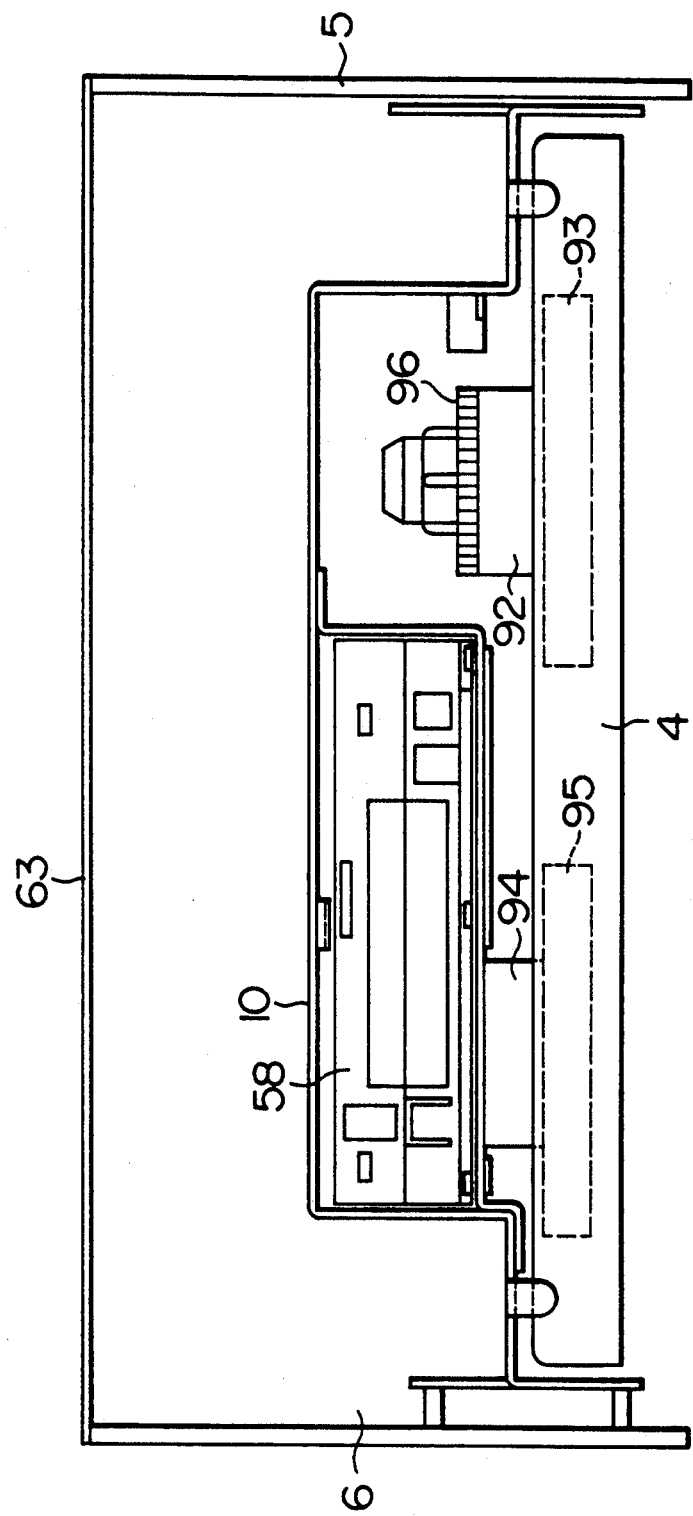

When the insertion of the miniature tape cassette 58 to a predetermined portion on the miniature tape cassette holder 10 is detected by a miniature tape cassette detection means (not shown), the driving motor 33 operates to cause a further counter-clockwise rotation of the cam gear 30 from the state shown in FIG. 12. The further counter-clockwise rotation of the cam gear 30 from the position of FIG. 12 corresponds to a further rotation in the minus direction from the −120° position in the cam diagram of FIG. 12. The second cam groove in the cam gear 30 has a stroke in the range of this rotation angle. In consequence, the slide lever 47 having the cam follower 50 engaging with the second cam groove (not shown) is made to slide to the right from the position of FIG. 12, with the result that the slide lever 45 having the projection 48 engaging with the hole 49 in the slide lever 47 is also moved to the right as viewed in FIG. 12. The movement of the slide lever 45 to the right as viewed in FIG. 12 causes a counter-clockwise rotation of the gear 42 having the pinion 42a meshing with the rack 46 of the slide lever 45. As a result, the miniature tape cassette holder 10, having the projection 38 slidingly engaging with the groove 40 in the driving arm 39, is further moved to the right from the position of FIG. 12 along the guide grooves 11, 12, while holding the miniature tape cassette 58, so as to reach the position shown in the plan view of FIG. 15. In this state, the projection 62 of the conversion lever 51 engages with the lid-opening portion 64 provided on the upper plate 63 and is capable of opening the front lid 100 of the standard-type tape cassette 89, and the miniature tape cassette holder 10 is moved along the guide grooves 11, 12 downward to the position shown in FIG. 14, so that the conversion lever 51 is rotated counter-clockwise as viewed in FIG. 14 when the miniature tape cassette 58 is mounted on the apparatus. The rotation of the conversion lever 51 in the counter-clockwise direction as viewed in FIG. 13 causes the projection 65 of the conversion lever 51 to push upward the shaft 66 provided on the auxiliary lever 55, so that the auxiliary lever 55 is rotated counter-clockwise as viewed in FIG. 14. In consequence, the lid-opening lever 53, having the shaft 54 engaging with the auxiliary lever 55, is also rotated counter-clockwise as viewed in FIG. 14, thereby opening the front lid 59 of the miniature tape cassette 58 as shown in FIG. 14. FIGS. 15 and 16 show, in plan and front elevation views, the apparatus in the state shown in FIG. 14.

A further rotation of the shaft of the driving motor 33 causes the cam gear 30 to rotate counter-clockwise, so that the slide lever 47 slides to the right as viewed in FIG. 14. In this case, however, the slide lever 45 does not move because the driving arm 39 is prevented from rotating, since the miniature tape cassette 58 has already been mounted. In consequence, the hole 49 in the slide lever 47 and the projection 48 of the slide lever 45 are spaced from each other so that the driving arm 39 is rotatingly urged clockwise by the force of the tension spring 99, so as to be pressed onto the miniature tape cassette 58.

A description will be given of the manner in which the miniature tape cassette is taken out of the apparatus.

When the user wishes to take the miniature tape cassette out of the apparatus which has completed its operation with the miniature tape cassette as shown in FIG. 14, the user pushes the cassette ejector button 97. In consequence, the driving motor 33 operates so as to rotate the cam gear 30 clockwise from the state shown in FIG. 14. As a result, an operation is performed in a sequence reverse to that of the operation for mounting the miniature tape cassette, so that the miniature tape cassette holder 10 is moved from the position shown in FIG. 14 to the position shown in FIG. 12. In the state shown in FIG. 12, the user can pinch a portion of the miniature tape cassette 58 projected from the apparatus 1 and to take the miniature tape cassette 58 out of the apparatus. If the user wishes to mount another miniature tape cassette, the user simply pushes it into the apparatus.

However, if the user wishes to mount a standard-type tape cassette, the user pushes a tape cassette selection button 98 shown in FIG. 7, so that an operation is executed in a sequence which is reverse to that of the described operation for switching the state of the apparatus from the standard-type tape cassette stand-by state to the miniature tape cassette stand-by state. Thus, the apparatus is switched from the state shown in FIG. 9 to the state shown in FIG. 2, thus enabling the use of the standard-type tape cassette A description will be given of the mechanism for driving a standard-type tape cassette or a miniature tape cassette mounted on the apparatus.

The description will commence with the case where a standard-type tape cassette 89 is used. When the cassette mounting mechanism is in the standard-type tape cassette stand-by state as shown in FIG. 2, the first rod 178 and the second rod 184 are set in a state shown in FIG. 19, by the action of the slider lever 47 through the L-shaped lever 194. The bent portions 183 and 187 of the first rod 178 and second rod 184 are set at positions where they hinder the movement of the shaft holders 164A, 164B, so that the shaft holders 164A, 164B are urged by the springs against the first rod 178 and the second rod 184 so as to be correctly set at the first unloading position where they are received in the mouths 159A, 159B of the standard- o type tape cassette 89. The spacer pins 222, 223 provided on the first rod 178 are positioned such that they do not interfere with the base plate 208 in the horizontal direction, while the retaining pin 237 is located so as not to interfere with the retaining pin 237.

The notches 221A, 221B provided in the first and second rods 178 and 184 are positioned to oppose the projections 215, 216 of the miniature tape cassette heightwise locating members 211, 212 Therefore, the miniature tape cassette heightwise locating members 211, 212, miniature tape cassette locating pins 206, 207, connection gear 224 and the retaining pin 237 are set so as not to hinder the setting of the standard-type tape cassette 89 both in horizontal and vertical directions with respect to the chassis 4, although they are upwardly urged by the biasing springs 218A, 218B, 217, biasing means 229 and the torsion compression spring 235, respectively.

Figure 36:
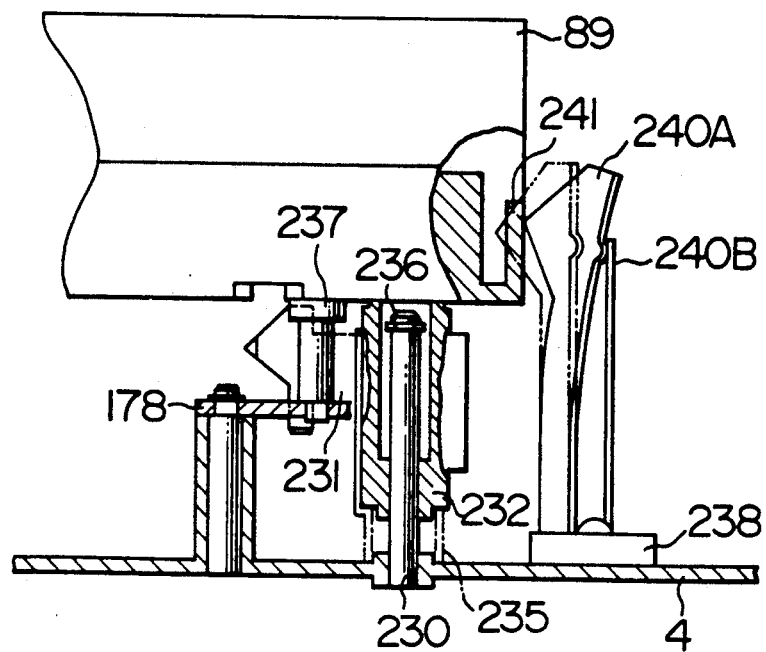

When the standard-type tape cassette 89 is inserted into the apparatus in this state, the inserted standard-type tape cassette 89 presses downward the miniature tape cassette heightwise locating members 211, 212, the miniature tape cassette locating pins 206, 207, the connection gear 224 and the conversion lever 231 so that these members are moved to the positions shown in FIG. 24(B), 26, 28 and 32 where they do not hinder the setting of the standard-type tape cassette 89 at the predetermined position The standard-type tape cassette 89 is horizontally located with respect to the chassis 4 by the standard-type tape cassette locating pins 202, 203. The height of the standard-type tape cassette 89 with respect to the chassis 4 is determined by cooperation between the standard-type tape cassette locating pins 202, 203 and the standard-type tape cassette heightwise locating pins 204, 205. As shown in FIG. 36, when the standard-type tape cassette 89 has an anti-erasure claw 241, the terminal 240A is pressed by the claw 241 so as to be resiliently deformed making into contact with the terminal 240B so that these terminals are electrically connected. However, if no anti-erasure claw is provided on the standard-type tape cassette, the terminal 240A is reset to the initial position indicated by a two-dot-and-dash line in the figure because there is no reaction from the claw 241, although the terminal 240A is once deformed towards the terminal 240B. In this case, therefore, no electrical contact is made between the terminal 240A and 240B. It is thus possible to detect presence or absence of the anti-erasure claw 241 on the standard-type tape cassette 89.

When a PLAY button on the front panel 2 is pressed in this state, the extraction members 157A, 157B are respectively moved along guide grooves 158A, 158B to positions where they can wind the magnetic tape around the rotary cylinder 153, to the loading positions. Simultaneously, the tension post 174 and the extraction post 176 are rotated so that the apparatus becomes ready for reproduction as shown in FIG. 20.

A description will be given hereinafter as to the operation for conducting the switching from the state ready for use of the standard-type tape cassette 89 to the state ready for use of the miniature tape cassette 58.

As the tape cassette selection button 89 is pressed, the loading motor (not shown) provided on the apparatus starts to operate so as to cause the extraction members 157A, 157B to move towards the rotary cylinder 153. Thereafter, the driving motor 33 operates to set the miniature tape cassette holder 10 at the position shown in FIG. 9 through the operation described before. In this state, the bent portion (not shown) of the slide lever 47 is moved away from the pin 197 of the L-shaped lever 194, so that the first rod 178 is moved by the force of the biasing spring 189 to the position shown in FIG. 21. As the loading motor (not shown) operates in this state, the shaft holders 164A, 164B are moved from the first unloading position to the second unloading position along the guide grooves 158A, 158B because, in this case, the bent portions 183, 187 of the first and second rods 178, 184 do not hinder the movement of the shaft holders 164A, 164B. The movement of the shaft holders 164A, 164B is continued until they are stopped by the second control members 200, 201. The guide rings S166 and T167 stop after a slight over-run, at positions where they slightly stretch the biasing springs 245A, 245B.

The biasing forces of the biasing springs 245A, 245B are transmitted to the guide pins 165A, 165B through the slide members 171A, 171B and the connection plates 246A, 246B. In consequence, the shaft holders 164A, 164B are pressed onto the second control members 200, 201. Therefore, the extraction members 157A, 157B can be correctly set at the second unloading position, even if the amounts of rotation of the guide rings S166 and T167 fluctuate due to fluctuation in rotation of the shaft of the loading motor (not shown) and fluctuation in the loads on various portions of the apparatus. Simultaneously with the operation for setting the extraction members 157A, 157B correctly at the second unloading position, another driving means (not shown) drives the tension post 174 and the extraction post 176 into the mouths 160A, 160C of the miniature tape cassette 58. At the same time, the spacer pins 222, 223 provided on the first rod 178 are moved to positions where they horizontally interfere with the base plate, so that the retaining pin 237 is moved to a position where it interferes with the conversion lever 231. The notches 221A, 221B provided in the first rod 178 and the second rod 184 are positioned so as not to oppose the projections 215, 216 of the miniature tape cassette heightwise locating members 211, 212. Namely, the miniature tape cassette heightwise locating members 211, 212, miniature tape cassette locating pins 206, 207 and the retaining pin 237 ar urged upward by the biasing springs 209, 217, 218 and the torsion compression spring 235, respectively, but the range available for the sliding motion is reduced as compared with the mode in which the standard-type tape cassette 89 is used. The apparatus 1 is thus set to the state ready for operation with the miniature tape cassette 58.

A description will be given of the operation of the apparatus with a miniature tape cassette 58.

Figure 25:
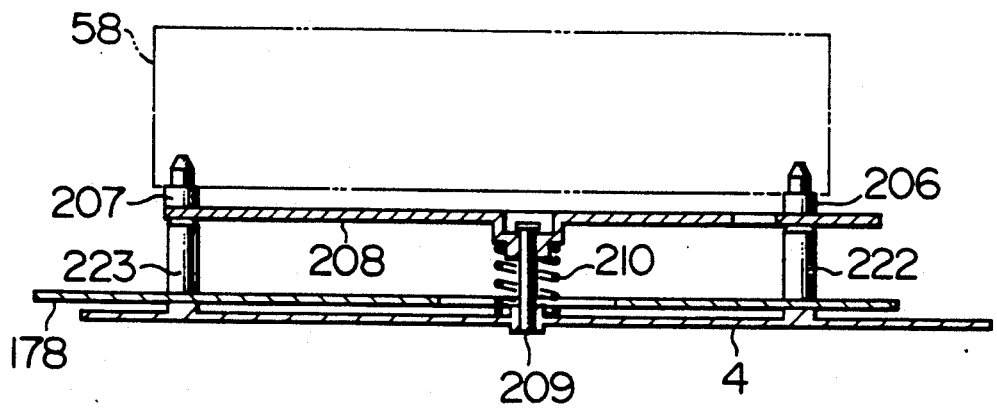
Figure 26:
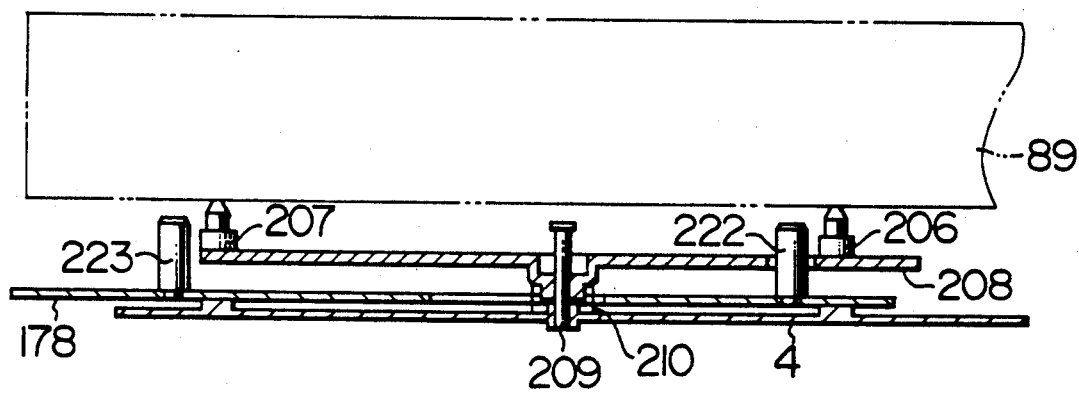

The apparatus is now ready for operation with a miniature tape cassette 58 as described above. When a miniature tape cassette 58 is inserted into the apparatus, the miniature tape cassette 58 pushes downward the miniature tape cassette heightwise locating members 211, 212 and the miniature tape cassette locating pins 206, 207 which are urged upward to positions shown in FIGS. 24(A), 25 and 27 where the miniature tape cassette 58 is allowed to be seated at a predetermined position. More specifically, the miniature tape cassette locating pins 206, 207 are pressed onto the chassis 41 through the first rod 178, spacer pins 222, 223 and the base plate 208 so that the height of these pins 208, 207 are definitely determined with respect to the chassis 4 as shown in FIG. 25. Similarly, the miniature tape cassette locating members 211,212 are pressed onto the first rod 178 and the second rod 218, respectively, so that they are set at a predetermined height with respect to the chassis 4. On the other hand, the rotary member 228 provided on the take-up reel 227 of the miniature tape cassette 58 is moved to a position where it engages with the connection gear 224. In order to facilitate the meshing of the connection gear 224 with the tape-up reel base 9, the take-up reel base 9 is inched rotationally by a motor (not shown). Thus, the miniature tape cassette 58 is correctly located and the connection gear 224 is brought into engagement with the rotary member 228 of the take-up reel 227. In this state, it is possible to extract the magnetic tape by means of the driving means. An engaging pin 237 provided on the first rod 178 is disposed under the retaining portion of the conversion lever 231 so that the vertical sliding movement of the conversion lever 231 is limited. Thus, the conversion lever 231 is allowed only to rotate.

If the miniature tape cassette 58 has no anti-erasure claw 242, the conversion lever 231 is rotated clockwise by the resetting force of the torsion compression spring 235 so that the claw engaging portion 23 of the conversion lever 231 is made to engage with a hole 242A or vacancy provided in a portion of the miniature tape cassette 58 corresponding to the anti-erasure claw 242. In synchronization with this operation, the operating portion 234 is moved away from the terminal 240A so that the terminal 240A never contacts the terminal 240B. Conversely, if the anti-erasure claw 242 is on the miniature tape cassette 58, the claw 242 exerts a sustained force on the tapered portion 243, so that the conversion lever 231 is made to rotate counter-clockwise around the lever support shaft 230 with the claw engaging portion 233 being thereof guided by the anti-erasure claw 242. In consequence, the operating tapered portion 234 presses the terminal 240A towards the terminal 240B so as to bring them into contact with each other. It is thus possible to detect the presence or absence of the miniature tape cassette 58.

When a play button PLAY on the front panel is pushed in this state, the extraction members 157A, 157B are moved along the guide grooves 158A, 158B to the position where they can wind the magnetic tape around the rotary cylinder 153, that is the loading position. At the same time, the tension post 174 and the extraction post 176 also are rotated so that the apparatus is set in the state ready for reproduction as shown in FIG. 22.

A description will be given of the operation for switching the apparatus from the state ready for operation with a miniature tape cassette 58 to the state ready for use with the standard-type tape cassette 89.

As the tape cassette selection button 98 is pressed, the loading motor (not shown) provided on the apparatus is made to rotate s that the extraction members 157A,157B are moved to positions closer to the rotary cylinder 153 than the bent portions 183, 187 of the first and second rods 178, 184. Subsequently, the driving motor 33 rotates so as to perform the operation described before, whereby the standard-type tape cassette holder 7 is set in a state shown in FIG. 2. In this state, the bent portion (not shown) of the slide lever 47 is moved into contact with the pin 197 of the L-shaped lever 194, so that the first rod 178 is moved against the biasing force of the biasing spring 189 to the position shown in FIG. 19.

Figure 19:
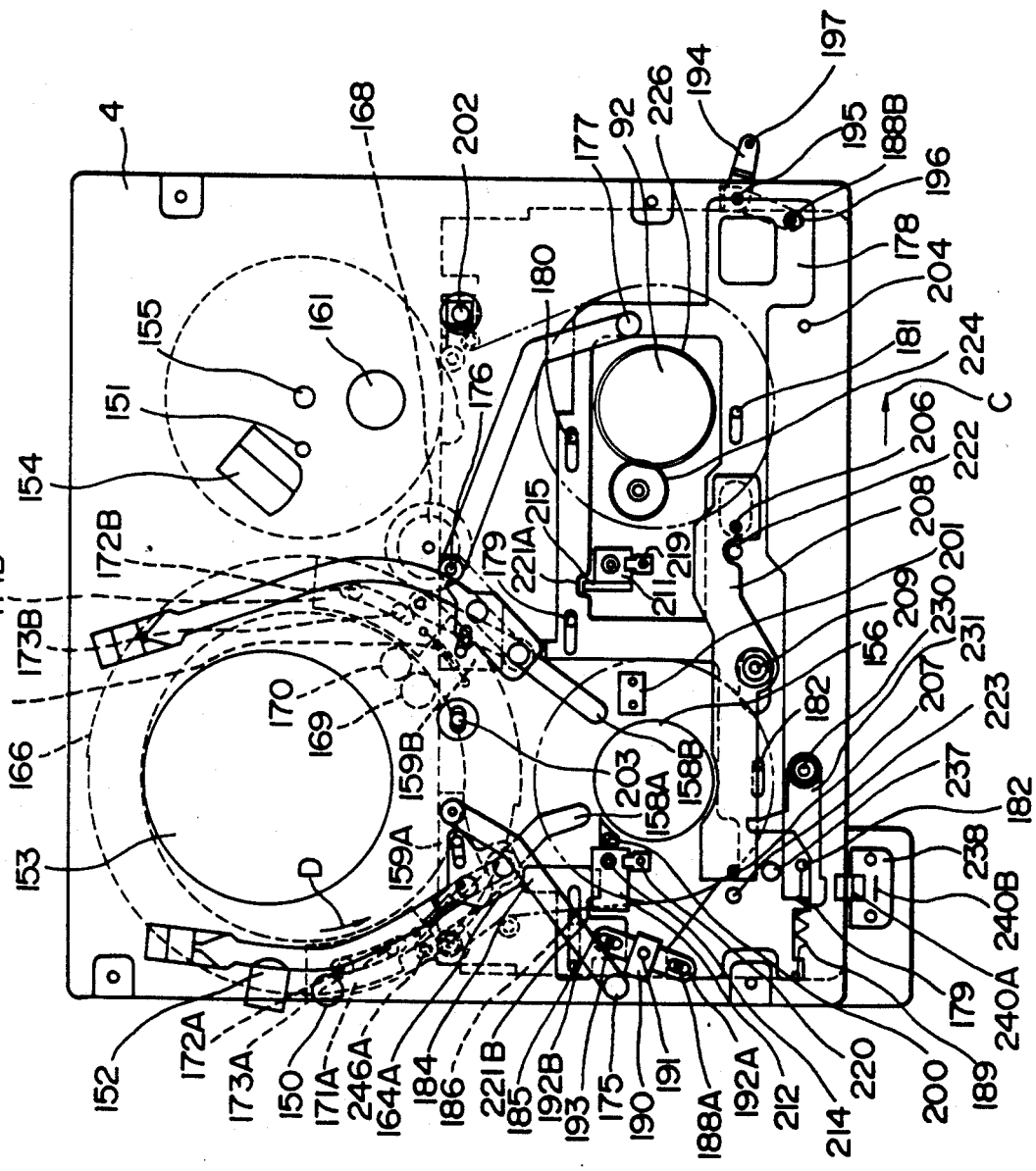

Similarly, the second rod 184 also is moved to a position shown in FIG. 19 through the conversion lever 190. When the loading motor (not shown) rotates in this state, the shaft holders 164A, 164B are moved along the guide grooves 158A, 158B until they are stopped by the bent portions 183, 187 of the first and second rods 178, 184. The guide rings S166 and T167 stop after a slight over-run, lightly stretching the biasing springs 245A, 245B. The biasing forces of the biasing springs 245A, 245B are transmitted to the guide pins 165A, 165B through the slide members 171A, 171B and the connection plates 246A, 246B so that the shaft holder 164A, 164B are pressed to the bent portions 183, 187 of the first and second rods 178, 184. Therefore, the extraction members 157A, 157B are correctly located at the first unloading position despite any fluctuation in the amounts of rotation of the guide rings S166 and the guide ring T167 due to reasons such as a fluctuation in the amount of rotation of the shaft of the loading motor (not shown) and fluctuations in the loads on various portions of the apparatus. Simultaneously with the operation for locating the extraction members 157A, 157B at the unloading position, another driving means (not shown) operates to move the tension post 174 and the extraction post 176 into the mouths 159A,159B of the standard-type tape cassette 89. On the other hand, the spacer pins 222, 223 provided on the first rod 178 are moved to positions where they do not horizontally oppose the base pate 208, while the retaining pin 237 is moved to a position where it does not oppose the conversion lever 231. In addition, the notches 221A, 221B provided in the first rod 178 and the second rod 184 are moved to positions where they oppose the projection 215, 216 of the miniature tape cassette locating members 211, 212. Thus, the apparatus is set to the state ready for use of the standard-type tape cassette 89.

As will be understood from the foregoing description, the magnetic recording and/or reproducing apparatus of the present invention can operate both with a standard-type tape cassette and a miniature tape cassette, without requiring the use of a cassette adapter.

What is claimed is:

1. A magnetic tape cassette loading/unloading apparatus for a magnetic recording/reproducing apparatus including a housing having a top surface and a front surface, said cassette loading/unloading apparatus comprising:
    a cassette insertion opening formed in said front surface, for receiving both a standard-type tape cassette and a miniature tape cassette of a size smaller than that of said standard-type tape cassette;
    first holding means for holding said standard-type tape cassette inserted through said cassette insertion opening;
    second holding means for holding said miniature tape cassette inserted through said cassette insertion opening;
    tape driving means for driving a magnetic tape contained in said standard-type tape cassette and a magnetic tape contained in said miniature tape cassette;
    first shifting means for reciprocatingly shifting said first holding means between a first position where said standard-type tape cassette inserted through said cassette insertion opening is received in said first holding means and a second position where said standard-type tape cassette after being received in said first holding means is loaded on said tape driving means;
    second shifting means for shifting said second holding means selectively to one of a third position where said second holding means does not hinder the movement of said standard-type tape cassette during shifting by said first shifting means, a fourth position where said miniature tape cassette inserted through said cassette insertion opening is received in said second holding means and a fifth position where said miniature tape cassette after being received by said second holding means is loaded on said tape driving means, said second shifting means shifting said second holding means to said third position when said first shifting means shifts said first holding means to said second position so as to load or unload said standard-type tape cassette onto or from said tape driving means; and
    a single drive means for driving both said first shifting means and said second shifting means.

2. A magnetic tape cassette loading/unloading apparatus as set forth in claim 1, wherein said second holding means includes a retaining means for retaining said second holding means at said fourth position where said miniature tape cassette is received.

3. A magnetic tape cassette loading/unloading apparatus for a magnetic recording/reproducing apparatus, said cassette loading/unloading apparatus comprising:
    tape driving means for driving a magnetic tape contained in a standard-type tape cassette or a magnetic tape contained in a miniature tape cassette of a size smaller than that of said standard-type tape cassette;
    first shifting means for reciprocatingly shifting said standard-type tape cassette between a first position where said first shifting means receives said standard-type tape cassette and a second position where said standard-type tape cassette is loaded on said tape driving means;
    second shifting means for reciprocatingly shifting said miniature tape cassette between a third position where said second shifting means receives said miniature tape cassette and a fourth position where said miniature tape cassette is loaded on said tape driving means;
    first lid opening means for applying a first opening force to a front lid of said standard-type tape cassette during shifting of said standard-type tape cassette to said second position by said first shifting means; and
    second lid opening means for applying a second opening force to a front lid of said miniature tape cassette, said second lid opening means being engaged with said first lid opening means such that said first lid opening means transmits a force to said second lid opening means to cause said second lid opening means to generate said second opening force during shifting of said miniature tape cassette to said fourth position by said second shifting means.

4. A magnetic tape cassette loading/unloading apparatus for a magnetic recording/reproducing apparatus including a housing having a top surface and a front surface formed therein with a cassette insertion opening, said cassette loading/unloading apparatus comprising:
    first holding means for holding a standard-type tape cassette incorporating a magnetic tape;
    second holding means for holding a miniature tape cassette incorporating a magnetic tape;
    tape driving means for driving said magnetic tape contained in said standard-type tape cassette or said magnetic tape contained in said miniature tape cassette;
    first shifting means for reciprocatingly shifting said first holding means between a first position where said standard-type tape cassette is received in said first holding means and a second position where said standard-type tape cassette after being received in said first holding means is loaded on said tape driving means;
    second shifting means for shifting said second holding means selectively to one of a third position where said second holding means does not hinder the movement of said standard-type tape cassette during shifting by said first shifting means, a fourth position where said miniature tape cassette inserted through said cassette insertion opening is received in said second holding means and a fifth position where said miniature tape cassette after being received by said second holding means is loaded on said tape driving means;

an extraction means for moving to and from one of a loading position where said extraction means enables said magnetic tape of said standard-type tape cassette or said magnetic tape of said miniature tape cassette to make contact with a rotary magnetic head of said magnetic recording/reproducing apparatus to enable recording and/or reproducing, a first unloading position where said extraction means extracts said magnetic tape of said standard-type tape cassette to position it at said loading position when said standard-type tape cassette is in said second position, and a second unloading position where said extraction means extracts said magnetic tape of said miniature tape cassette to position it at said loading position when said miniature tape cassette is in said fifth position;

a first control means for moving between an operative position where said first control means fixes said extraction means to said first unloading position and an inoperative position where said first control means does not fix said extraction means to said first unloading position;

a second control means for fixing said extraction means to said second unloading position; and a third shifting means selectively operatively associated with said first shifting means or said second shifting means, for reciprocatingly moving said first control means between said operative position and said inoperative position.

5. A magnetic tape cassette loading/unloading apparatus for a magnetic recording/reproducing apparatus including a housing having a top surface and a front surface, said cassette loading/unloading apparatus comprising:

a cassette insertion opening formed in said front surface, for receiving both a standard-type tape cassette and a miniature tape cassette of a size smaller than that of said standard-type tape cassette;

first holding means for holding said standard-type tape cassette inserted through said cassette insertion opening;

second holding means for holding said miniature tape cassette inserted through said cassette insertion opening;

tape driving means for driving a magnetic tape contained in said standard-type tape cassette and a magnetic tape contained in said miniature tape cassette;

first shifting means for reciprocatingly shifting said first holding means between a first position where said standard-type tape cassette inserted through said cassette insertion opening is received in said first holding means and a second position where said standard-type tape cassette after being received in said first holding means is loaded on said tape driving means;

second shifting means for shifting said second holding means selectively to one of a third position where said second holding means does not hinder the movement of said standard-type tape cassette during shifting by said first shifting means, a fourth position where said miniature tape cassette inserted through said cassette insertion opening is received in said second holding means and a fifth position where said miniature tape cassette after being received by said second holding means is loaded on said tape driving means, said second shifting means shifting said second holding means to said third position when said first shifting means shifts said first holding means to said second position so as to load or unload said standard-type tape cassette onto or from said tape driving means; and means for covering substantially a part of said cassette insertion opening which does not oppose said second holding means when said second holding means is located at said fourth position.

6. A magnetic tape cassette loading/unloading apparatus as set forth in claim 5, wherein said covering means further includes an indicating portion for indicating that said miniature tape cassette is in a use mode.

* * * * *